United States Patent
Van Der Leest et al.

(10) Patent No.: US 10,554,398 B2
(45) Date of Patent: Feb. 4, 2020

(54) CRYPTOGRAPHIC KEY PRODUCTION FROM A PHYSICAL UNCLONABLE FUNCTION

(71) Applicant: INTRINSIC ID B.V., Eindhoven (NL)

(72) Inventors: Vincent Van Der Leest, 's-Hertogenbosch (NL); Roel Maes, Geel (BE); Erik Van Der Sluis, Bilthoven (NL); Franciscus Maria Joannes Willems, Geldrop (NL)

(73) Assignee: INTRINSIC ID B.V., Eindhoven (NL)

( * ) Notice: Subject to any disclaimer, the term of this patent is extended or adjusted under 35 U.S.C. 154(b) by 282 days.

(21) Appl. No.: 15/539,900

(22) PCT Filed: Dec. 3, 2015

(86) PCT No.: PCT/EP2015/078454
§ 371 (c)(1),
(2) Date: Jun. 26, 2017

(87) PCT Pub. No.: WO2016/102164
PCT Pub. Date: Jun. 30, 2016

(65) Prior Publication Data
US 2018/0006813 A1    Jan. 4, 2018

(30) Foreign Application Priority Data

Dec. 24, 2014  (EP) .................................... 14200283
Aug. 6, 2015   (EP) .................................... 15179941

(51) Int. Cl.
*H04L 9/08*      (2006.01)
*G09C 1/00*      (2006.01)

(52) U.S. Cl.
CPC ............. *H04L 9/0866* (2013.01); *G09C 1/00* (2013.01); *H04L 9/0869* (2013.01); *H04L 2209/08* (2013.01); *H04L 2209/34* (2013.01)

(58) Field of Classification Search
CPC ......... G09C 1/00; G06F 7/588; H04L 9/0861; H04L 9/0866; H04L 9/0869;

(Continued)

(56) References Cited

U.S. PATENT DOCUMENTS

2005/0288925 A1  12/2005  Liardet et al.
2016/0087805 A1*  3/2016  Li .......................... H04L 9/3278
                                                        713/193

FOREIGN PATENT DOCUMENTS

EP     1510914 A1    3/2005
EP     1610462 A1   12/2005
(Continued)

OTHER PUBLICATIONS

Maes, R., et al., "Secure Key Generation from Biased PUFs," International Association for Cryptologic Research 2015, vol. 20150621:080549, pp. 1-26.

(Continued)

*Primary Examiner* — Kevin Bechtel
(74) *Attorney, Agent, or Firm* — Kenealy Vaidya LLP

(57) ABSTRACT

Some embodiments are directed to an electronic cryptographic device configured to determine a cryptographic key. The cryptographic device has a physically unclonable function, a debiasing unit, and a key reconstruction unit. The PUF is configured to produce a first noisy bit string during an enrollment phase and a second noisy bit string during a reconstruction phase. The debiasing unit (120) is configured to determine debiasing data from the first noisy bit string during the enrollment phase. The debiasing data marks bits in the first noisy bit string as retained or discarded. The key reconstruction unit is configured to determine the cryptographic key from bits in the second noisy bit string marked as retained by the debiasing data, the cryptographic key being independent from bits in the second noisy bit string marked as discarded by the debiasing data.

19 Claims, 10 Drawing Sheets

(58) Field of Classification Search
CPC ....... H04L 9/0877; H04L 9/0894–0897; H04L 9/3278; H04L 2209/12–127; H04L 2209/34
See application file for complete search history.

(56) References Cited

FOREIGN PATENT DOCUMENTS

| EP | 1610463 A1 | 12/2005 |
|---|---|---|
| JP | 2009163737 A | 7/2009 |
| JP | 2009524998 A | 7/2009 |
| JP | 2010117846 A | 5/2010 |
| WO | WO2011086688 A1 | 7/2011 |
| WO | WO2013173729 A1 | 11/2013 |

OTHER PUBLICATIONS

Koeberl, P., et al., "Evluation of a PUF Device Authentication Scheme on a Discrete 0.13um SRAM," Nov. 27, 2011, Trusted Systems, Springer Berling Heidelberg, Berlin, Heidelberg, pp. 271-288, XP047010558.

Koeberl, P., et al., "Entropy loss in PUF-based key generation schemes: The repetition code pitfall," 2014 IEEE International Symposium on Hardware-Oriented Security and Trust (HOST), IEEE, May 6, 2014, pp. 44-49, XP032620117.

Maes, R., et al., "PUFKY: A Fully Functional PUF-Based Cryptographic Key Generator," Sep. 9, 2012, Correct System Design; [Lecture Notes in Computer Sicence; Lect. Notes Computer], Springer International Publishing, Cham, pp. 302-319, XP047016592.

Von Neumann, J., "Various Techniques Used in Connection With Random Digits," Journal of Research of the National Bureau of Standards, Washington, DC, US, vol. 5, No. 5, Jan. 1, 1963, pp. 768-770, XP002103231.

Mar. 17, 2016 International Search Report and Written Opinion issued in International Application No. PCT/EP2015/078454.

* cited by examiner

| 630 | 650 | | 650 | 651 | 652 |
|---|---|---|---|---|---|
| (0,0) | (0,0,0,0) | | (0,0,0,0) | 2 | 22 |
| (0,1) | (0,1,0,1) | | (0,1,0,1) | 6 | 18 |
| (1,0) | (1,0,1,0) | | (1,0,1,0) | -6 | 30 |
| (1,1) | (1,1,1,1) | | (1,1,1,1) | -2 | 26 |

CRYPTOGRAPHIC KEY PRODUCTION FROM A PHYSICAL UNCLONABLE FUNCTION

CROSS REFERENCE TO RELATED APPLICATION

This application is a U.S. National Phase filing under 35 C.F.R. § 371 of, and claims priority to, International PCT Patent Application No.: PCT/EP2015/078454, filed on Dec. 3, 2015, which claims priority to European Patent Application No.: 14200283.1, and European Patent Application No.: 15179941.8, filed on Dec. 24, 2014, and Aug. 6, 2015, respectively, the contents of each of which are hereby incorporated in their entireties by reference.

FIELD OF THE INVENTION

The invention relates to an electronic cryptographic device, an electronic cryptographic method, and a non-transitory tangible computer readable storage medium.

BACKGROUND

A physical unclonable function exploits manufacturing variations to derive a digital identifier. The digital identifier is thus tied to a physical medium. Because the physical unclonable function depends on random process variation, it is easy to create a PUF but it is very hard, if not downright impossible, to create a PUF which would give rise to a particular pre-determined identifier. The manufacturing variations lead to different physical characteristics of the memory element. For example, the physical characteristics may include: doping concentrations, oxide thickness, channel lengths, structural width (e.g. of a metal layer), parasitics (e.g. resistance, capacitance). When a digital circuit design is manufactured multiple times, these physical characteristics will vary slightly and together they will cause the behavior of an IC element, e.g., a memory element, to behave differently in some situations. For example, the start-up behavior is determined by manufacturing variations in the physical characteristics.

The fact that PUFs produce device-intrinsic and unpredictable responses make them a very suitable candidate to generate cryptographic keys from. In contrast to traditional non-volatile key storages, a PUF-based key is not stored in digital format, but stems from small random deviations in the PUF's physical structure. Moreover, the generation of the key itself does not depend on externally provided randomness, which may be of low quality, but uses the high-entropy intrinsic randomness of the device itself. The combination of these factors can lead to highly secure solutions for cryptographic key storage.

Using a PUF the need for secure memory to store a key may be circumvented. A PUF furthermore provides natural protection against malicious attempts to obtain the cryptographic key through reverse engineering, since damage which could be inflicted to the PUF during the attempt likely changes the digital identifier. Preferably, the digital identifier is unique for the electronic device wherein the physical unclonable function is embedded.

For example, it has been observed that the startup behavior of some memory elements, demonstrate PUF like behavior. When such memory is powered-up, it tends to contain content, i.e., comprise a sequence of data values, which depends on the at least partially random physical characteristics of the components, e.g., gates or transistors, which make up the memory, e.g., their physical arrangement relative to each other. If the memory is powered-up multiple times, it would contain, up to a large percentage, the same content.

A PUF provides unpredictable and device-unique responses, yet due to their physical origin, these may be subject to measurement noise, and environmental influences. Cryptographic keys on the other hand need to be perfectly reliable and of full entropy. To bridge this gap, some amount of post-processing on the PUF responses is required. One way to address noise is the use of so-called fuzzy extractors. A fuzzy extractor is able to transform a 'noisy' random value into a reliable key. An error correction procedure can be used in this process to correct for these fluctuations, and make sure an identical digital identifier is derived, each time the PUF is used. The error correction procedure uses so-called helper data. Helper data is also called noise reduction data.

A fuzzy extractor may comprise two stages. In an initial enrollment stage, a cryptographic key is derived from the PUF response. In the enrollment process, helper data or noise reduction data for the PUF response is produced. Later on in the field, the reconstruction stage reevaluates the PUF response and uses the noise-reduction data from the enrollment stage to reconstruct the same key. The noise-reduction data hence needs to be stored in between the enrollment and reconstruction stages.

SUMMARY OF THE INVENTION

A desirable property of a fuzzy extractor in this respect is that the noise-reduction data contains no information about the key which is derived. In other words, the noise-reduction data contains no sensitive information and cannot be used to attack the generated key. As a result, the noise-reduction data can be stored and communicated publicly and does not need shielding from adversaries as a direct storage of the key would need.

The operation of a fuzzy extractor may be based on the use of an error correcting code. Typically the error correcting code is a block code and is linear, e.g., a linear error correcting block code. During enrollment, the fuzzy extractor calculates noise-reduction data for the PUF response, e.g., by calculating a number of parity relations on the PUF response bits and disclosing these relations in the noise-reduction data. Noise reduction data may be computed, e.g., by calculating the difference between one or more code words and the PUF response.

Due to this disclosure, the unpredictability of the PUF response (as measured by its entropy) may be significantly reduced.

The inventors found the information leakage about the key through the noise-reduction data is non-zero if the PUF has a high bias. In fact, if the PUF has very high bias the noise-reduction data may even reveal sufficient information about the key to allow complete reconstruction of the key by an attacker.

Traditional debiasing methods taken from such different fields as, say random number generation, cannot be applied to a PUF and key generation. A PUF response is obtained at least twice. Each time the same cryptographic key should be produced. However, the PUF output is often not entirely deterministic. Even a relatively small amount of noise could cause such a debiasing procedure to select different bits for use as debiased output. Such a system would be entirely unusable for key generation. For example, the classic von Neumann debiasing which produces one un-biased output bit for every unequal bit pair produced by a random bit generator cannot directly be applied to a PUF. Applying classic von Neumann debiasing on a PUF during enrollment and during reconstruction would select different bits; it would not be possible to generate a reproducible key therefrom.

An electronic cryptographic device arranged for an enrollment phase and a later use phase is provided as defined in the claims. In an embodiment, the electronic cryptographic device is arranged to determine a cryptographic key. The cryptographic device is arranged for an enrollment phase and a later reconstruction phase. The cryptographic device comprises physically unclonable function, a debiasing unit, and a key reconstruction unit.

The physically unclonable function is arranged to produce a first noisy bit string during the enrollment phase and a second noisy bit string during the reconstruction phase.

The debiasing unit for reducing bias in the first noisy bit string, the debiasing unit being arranged to determine debiasing data from the first noisy bit string during the enrollment phase, the debiasing data marking bits in the first noisy bit string as retained or discarded.

A key reconstruction unit arranged to determine the cryptographic key from bits in the second noisy bit string marked as retained by the debiasing data, the cryptographic key being independent from bits in the second noisy bit string marked as discarded by the debiasing data.

In the enrollment phase, e.g., the debiasing unit 120 makes a selection which bits to retain or discard from the PUF response. This information is recorded in debiasing data. When the PUF is queried a second time, the same bits are selected using the debiasing data. Thus even if noise is present in the second PUF response, the same bits are selected as were selected during the first PUF response. Note that noise is likely still present in the bits selected from the second response.

In this application bias refers to the situation in which one of the 1 or 0 bits are more likely than the other one of the 1 or 0 bits. For example, bias of a PUF could be defined as the absolute difference between the probability of producing a 1 bit and the probability of producing a 0 bit. Bias could also be defined as the maximum of the probability of a 1 bit and the probability of a 0 bit. Bias may be determined for a certain bit location by comparing multiple devices. Typically bias is uniform for larger portions of bit locations. For some PUFs, especially memory based PUF there may be some variation in bias across the memory. For example, bias can vary across a memory, but be constant for larger zones; for example the first and second half of the memory may each have constant bias but differ from each other. Bias may also vary locally, for example, some memories show a difference in bias for even and odd bit locations.

A PUF which has a low bias will, at least on average produce a bit string, in which the absolute difference between the fraction of 1 bits and the fraction of 0 bits is small. The fraction may be taken as the number of 1 or 0 bits respectively, divided by the length of the string.

The cryptographic key may be used in a number of cryptographic protocols, including encrypting or decrypting information using the cryptographic key, electronic signing of information using the cryptographic key. Cryptographic keys derived from the PUF may be symmetric or asymmetric keys. Embodiments of the device and method described in the claims may be applied in a wide range of practical applications. Such applications include: banking card, sim cards, smart cards for pay per view, ID cards, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically illustrate the loss of entropy through minor bias, FIG. 1b schematically illustrate the loss of entropy through major bias, FIG. 2 schematically shows an example of an embodiment of an electronic cryptographic device, FIG. 3 schematically shows an example of an embodiment of an electronic cryptographic device, FIG. 4a schematically illustrates an enrolment phase in an example of an embodiment of an electronic cryptographic device, FIG. 4b schematically illustrates a reconstruction phase in an example of an embodiment of an electronic cryptographic device, FIG. 5a schematically illustrates an enrolment phase in an example of an embodiment of an electronic cryptographic device, FIG. 5b schematically illustrates a reconstruction phase in an example of an embodiment of an electronic cryptographic device, FIG. 6a schematically illustrates an enrolment phase in an example of an embodiment of an electronic cryptographic device, FIG. 6b schematically illustrates a reconstruction phase in an example of an embodiment of an electronic cryptographic device, FIG. 6c schematically illustrates an embodiment of a second error correcting code, FIG. 6d schematically illustrates embodiments of soft decision decoding, FIG. 7 schematically illustrates an embodiment of an electronic cryptographic method arranged to determine a cryptographic key.

LIST OF REFERENCE NUMERALS IN FIGS. 1A-6D

Figure 1A:
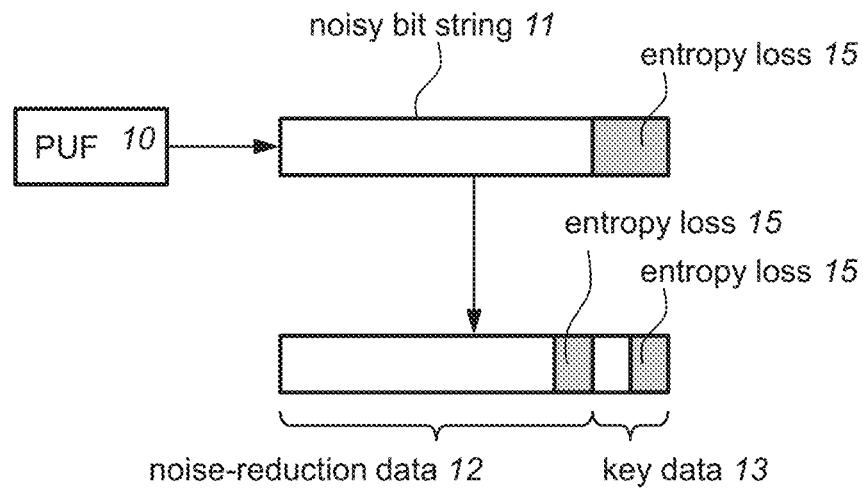

10 a physically unclonable function (PUF)
11 a noisy bit string
12 noise-reduction data
13 key data
15 entropy loss
100 an electronic cryptographic device
101 an electronic cryptographic device
110 a physically unclonable function (PUF)
112 a first noisy bit string
114 a second noisy bit string
116 a further noisy bit string
120 a debiasing unit
130 a noise-reduction unit
140 a storage
142 debiasing data
144 noise-reduction data
150 a key reconstruction unit
152 a normalizer
154 an error corrector
156 a key derivation unit
160 a statistical unit
165 random seed generating unit
412 a first PUF response
413 a sequence of bit pairs
414 debiased first PUF response
415 first code words
422 a second PUF response
423 debiased second PUF response
424 noisy code words
426 corrected code words
427 decoded code words
440 debiasing and noise-reduction data
442 debiasing data
442' debiasing data
444 noise reduction data
512 a first PUF response
513*a*, 513*b* a sequence of bit pairs
514 debiased first PUF response
515 first code words
522 a second PUF response
523 debiased second PUF response
524 noisy code words
527 decoded code words
542 debiasing data
544 noise reduction data
612 a first PUF response
613 a sequence of bit pairs
614 debiased first PUF response
615 first code words
622 a second PUF response
624 debiased and normalized second PUF response
627 hard decoded code words
628 soft decoded code words
640 debiasing and noise-reduction data
642 debiasing data
644 noise reduction data
630 seeds
650 second code words
651 correlation
652 soft decision distance

DETAILED DESCRIPTION OF PREFERRED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Figure 1B:
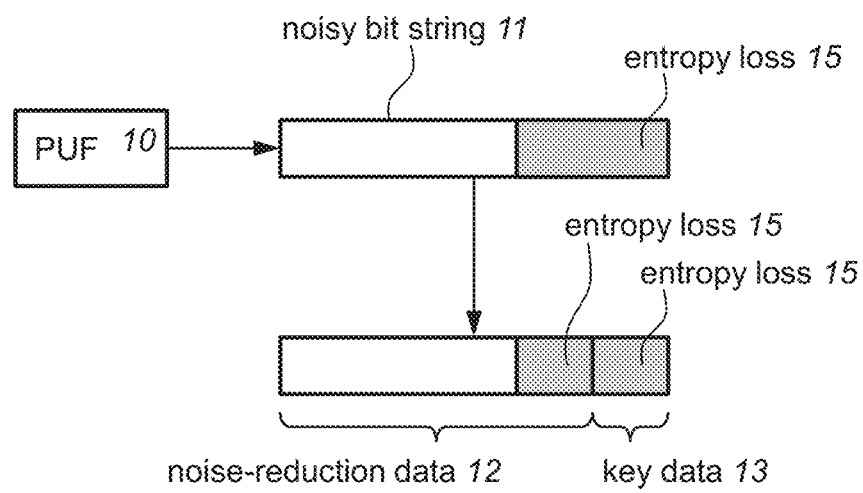

FIGS. 1*a* and 1*b* schematically illustrate the loss of entropy through bias. The "flow of entropy" during enrollment is conceptually shown in FIGS. 1*a* and 1*b*. Note the relative sizes of the boxes in FIGS. 1*a* and 1*b* are not necessarily illustrative of the relative sizes of the PUF response, noise reduction data, and key.

A PUF 10 produces a response 11 with a certain amount of entropy. The enrollment procedure produces noise-reduction data 12 which discloses a relatively large portion of the entropy contained in the PUF response. The remaining entropy after noise-reduction data disclosure is used to generate a cryptographically secure secret key from. In order to obtain a fully random key, the length of the key (in bits) can never be larger than the PUF response entropy reduced with the noise-reduction data disclosure.

In practice, a fuzzy extractor may be designed to work with a particular type of PUFs that generate responses with a certain noise level and a certain amount of entropy. The parameters of the underlying error-correcting codes are selected to be able to deal with the maximum expected number of bit errors. From these parameters, the resulting noise-reduction data disclosure for one response can be calculated, and hence also the remaining key entropy. Finally, the size of the PUF (# of bits in the response) is increased until a sufficient total amount of key entropy is left to extract a full-entropy key from.

PUF response entropy is reduced by the presence of bias in the PUF response, i.e., in case of a binary response 0's are systematically more prevalent than 1's (or vice versa). Entropy loss due to bias is illustrated at reference number 15 in FIGS. 1*a* and 1*b*.

Assume a fuzzy extractor with an entropy flow designed for a given amount of response entropy. FIG. 1*a* schematically illustrates the case of minor bias. The shaded part 15 of the PUF response 11 is the reduction in entropy with respect to the original situation in FIG. 1*a* due to bias. Because the response entropy is reduced, this will also have an effect on the noise-reduction data disclosure and the remaining entropy in key data 13; the eventual cryptographic key will be derived from key data 13. The remaining key entropy will be reduced, since there is less entropy to begin with, and there will be less entropy left after disclosure of the noise-reduction data. This may be a problem, since it means that key data 13 is less random than would be expected in the absence of bias. This reduction in key entropy, caused by bias in the PUF responses, is called the key leakage.

In a situation in which the PUF response entropy is significantly reduced, e.g., due to major bias, the key leakage can become dramatic. This is shown in FIG. 1b. In that case, the response entropy becomes so small that there is nothing left after disclosure of the noise-reduction data. There is hence no secret material left to extract a key from. In practice, this means that the noise-reduction data discloses all the response entropy, including the entropy used for the key. In other words, the key can be derived from the noise-reduction data. The fuzzy extractor becomes hence completely insecure.

A possible alternative solution to the key leakage problem, which does not use debiasing data, is to design the fuzzy extractor for the worst-case scenario where the PUF response entropy is reduced. In other words, the fuzzy extractor is designed such that there is an entropy margin for coping with possibly reduced entropy. There are however a number of problems with this solution:
1. An entropy margin is only able to cope with small reductions in PUF response entropy (e.g. minor bias in the order of a few percent). The margin is depleted very quickly when the PUF response entropy decreases.
2. The design of a fuzzy extractor quickly becomes very inefficient when one considers PUFs with even slightly reduced entropy. Since nearly all entropy present in a PUF response is disclosed by the noise-reduction data, the size of the PUF (# of response bits) needs to become very large in order to have some entropy left to derive a secure key from.
3. Using traditional methods, it may become impossible to design a fuzzy extractor which has any key entropy left at all if the PUF response entropy is significantly reduced (e.g. due to major bias). Even increasing the size of the PUF may not help in that case, since the effective entropy contribution per response bit is zero.

Another approach to the key leakage problem is to only consider PUFs which produce responses with very high or even full entropy. This approach does not require debiasing data. This is not really a solution since one is shifting the key leakage problem from the fuzzy extractor design to the PUF construction. There is a desire to continue using less than ideal PUF designs. Moreover, there are a number of issues with this option:
1. A fuzzy extractor which is designed for unbiased PUF responses has very little to no margin to cope with even the slightest bias which could always coincidentally occur.
2. Due to their construction, certain types of PUFs inherently have biased or reduced entropy responses. This solution is hence not applicable for these types of PUFs.
3. Even PUF types which typically have high-entropy responses will only seldom have perfectly unbiased responses. One always has a certain level of uncertainty when estimating the bias of a PUF type. Moreover, for a practical application with thousands or millions of PUF instances in the field, one also has to consider the outlier instances whose bias might deviate significantly from the average "unbiased" case.
4. The bias of a PUF response can also be influenced by conditions external to the PUF construction, e.g., temperature. If one wants a fuzzy extractor to operate securely under all circumstances, one needs to take into account that the PUF response might be (slightly) biased.

Embodiments, described below reduce the key leakage problem in case of biased PUF responses. The inventors found that introducing a debiasing operation prior to and/or integrated with the initial enrollment step reduces bias in the PUF response. This in turn ameliorates key leakage in side-information such as noise-reduction data.

Figure 2:
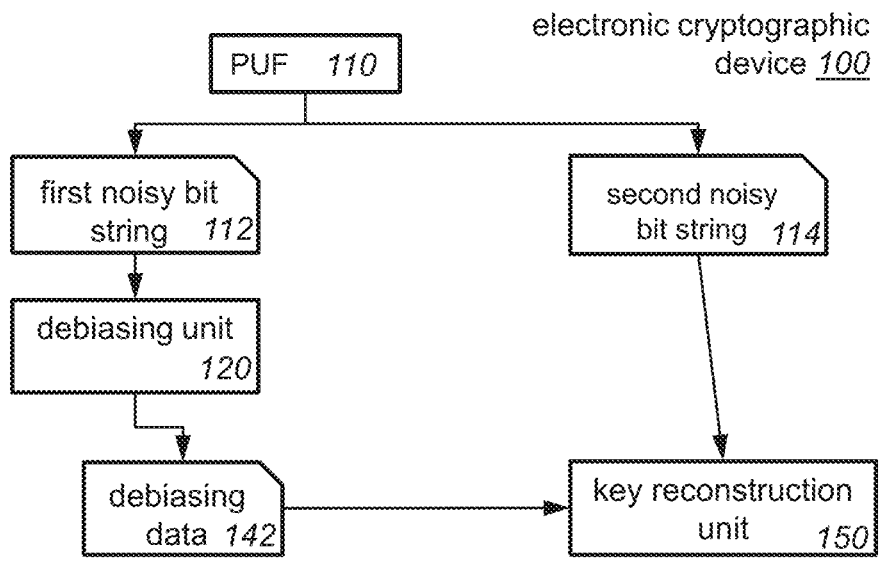

FIG. 2 schematically shows an example of an embodiment of an electronic cryptographic device 100.

Device 100 comprises a so-called physically unclonable function 110, usually referred to as a PUF. Device 100 is arranged to determine a cryptographic key. The cryptographic device is arranged for an enrollment phase and a later reconstruction phase. PUF 110 is arranged to produce a first noisy bit string 112 during the enrollment phase and a second noisy bit string 114 during the reconstruction phase. During the reconstruction phase, which may be repeated multiple times, the same cryptographic key is produced. During the enrollment phase data may be produced which enables the repeated identical production of the cryptographic key and/or reduce bias in the PUF.

If PUF 110 is exceptionally reliable and/or reliability of the application is of lower importance then the noise-reduction data may be dispensed with. In the latter case, debiasing may still be of value, to avoid reduced entropy in the key. In this case, the debiased PUF response could be used to derive the key, e.g., by concatenating retained bits, by applying a key derivation function etc.

The amount of change between subsequently produced noisy bit strings differs between different types of PUF; depending on the amount of change an error correcting code may be selected to correct for this amount of error. The noisy bit string is stable enough and long enough to produce a cryptographic key. The length of the noisy bit string of the PUF may be chosen with respect to desired key length, the error percentage of the PUF and/or the bias level of the PUF, etc.

PUF 110 may require a power-cycle, e.g., a power-down followed by a power-up to produce the noisy bit string again. The power-up signal may be regarded as a challenge. In device 100, PUF 110 produces the noisy bit string at least twice. Once during the enrollment-phase, PUF 110 produces a first noisy bit string. Later during the use-phase PUF 110 produces a second noisy bit string. The first and second noisy bit strings are sufficiently close to each other, e.g., the hamming weight of their difference is less than a threshold.

PUFs are random functions bound to a physical device in such a way that it is computationally infeasible to predict the output of the function without actually evaluating it using the physical device. Furthermore, as the PUF is realized by a physical system it is hard to clone. Physical systems that are produced by a production process that is not fully controlled (i.e. that contains some randomness) turn out to be good candidates for PUFs. In an embodiment, PUF 110 and thus cryptographic device 100 may be uniquely identified based on the response provided by PUF 110, and the key derived therefrom. The key may be used as an identifier, identifying the device.

The PUF's physical system is designed such that it interacts in a complicated way with stimuli and leads to unique but unpredictable responses. The stimuli of a PUF are referred to as the challenge. Some PUF allow a larger range of different challenges, producing different responses. A PUF challenge and the corresponding response are together called a Challenge-Response-Pair. However, a PUF may also have a single challenge. PUF 110 may be a single-challenge PUF. PUF 110 may also be a multiple-challenge PUF. In the latter case, PUF 110 is challenged with the same challenge or set of challenges when producing the noisy bit string, in particular the first and second noisy bit string.

A suitable source of PUFs are formed by an electronic volatile memory that contains, upon power-up, a response pattern of power-up values useful for identification of the memory, the response pattern depending on physical characteristics of the memory elements.

One known example of a PUF used to uniquely identify a device is the so-called SRAM PUF, which is based on the fact that, when an SRAM cell is started-up it starts up in a random state due to variations in the threshold voltages of the transistors, which, in turn, are due to doping variations. When this is done multiple times, each cell will start up in the same state most of the time. These PUFs may be realized on any device having SRAM memory on board.

Any memory showing a random start-up behavior which is sufficiently stable for identifying the memory is called a challengeable memory. As the start-up behavior is random, two different memories will have a large difference in their start-up memory pattern; as the start-up behavior is stable two start-up memory patterns of the same memory will have a small difference. Examples of such memories are SRAM memory cells as mentioned but also memory elements like flip-flops. Actually, any type of volatile memory may be used that comprises feedback loops.

A second kind of SRAM based PUFs can be constructed with Dual Port RAM. By writing on both ports at the same time different information, the memory cell is brought into an undefined state and shows a PUF-like behavior. This kind of PUF is described in more detail in WO2009024913. Other so-called Intrinsic PUFs are based on delay phenomena, see, e.g., US20030204743. A PUF may be constructed by simulating an SRAM memory cell on an FPGA, e.g., by cross-coupled invertors or latches, the so-called butterfly PUF see European patent EP2191410 B1 and WO2011018414A2. PUF 110 may be a physical unclonable function comprising a plurality of bus-keepers, e.g., as described in WO2012069545.

Device 100 comprises a debiasing unit 120. Debiasing unit 120 is arranged to reduce the bias in the output of PUF 110, in particular in first noisy bit string 112. Debiasing unit 120 is arranged to determine debiasing data 142 from first noisy bit string 112 during the enrollment phase. The debiasing data marks bits in the first noisy bit string as retained or discarded.

The debiasing data is selected so that outputs of PUF 110 after debiasing have lower bias than the immediate responses of PUF 110. In an embodiment, the debiasing unit 120 is arranged so that the absolute difference between the fraction of 1 bits and the fraction of 0 bits among the bits of the first bit string marked by the debiasing information as retained is smaller than among the first noisy bit string. In an embodiment, the debiasing unit 120 may be arranged so that the absolute difference between the fraction of 1 bits and the fraction of 0 bits among the bits of the first bit string marked by the debiasing information as retained, is zero.

In a simpler embodiment, the debiasing unit may be arranged with a predetermined number k, less than the bit length of the PUF responses. The number is chosen so that, taking account of bias, PUF 110, will have a high probability to have at least the number k 0 bits and at least k 1 bits. In fact, for any practical bias, this probability may be arbitrary high, assuming the bit length of the PUF responses may be taken sufficiently high.

The debiasing unit may be arranged to randomly select k 0 bits and k 1 bits from among the bits in the first PUF response 112 as retained, discarding all others. Debiasing data 142 indicates which bits were marked as retained and discarded during the enrollment phase. This information may be recorded in a number of ways. For example, debiasing data 142 may comprise a bit mask to indicate the retained bits. The retained bits may later be selected with, say, a bit-wise 'and' operation. For example, debiasing data 142 may included a list of indices pointing to selected bits.

This method of randomly selecting k 0 bits and k 1 bits works to reduce or even remove bias but still suffers from a few drawbacks. First of all, since exactly k 0's and 1's are selected, the unpredictability (i.e. entropy) is effectively a little reduced, because an attacker knows that there are exactly k 0's and 1's; in a truly random string that would not necessarily be the same number of 0 and 1 bits. Furthermore, one may use a stochastic method for randomly selecting 0's and 1's. However, an independent randomness source may not be available. Some of the embodiments below do not require independent randomness sources but use the inherent randomness in the bit strings for this.

Finally, if the bias is not uniform, some of the non-uniformity may survive in the "debiased" bit string. For example, if there is a location-dependent bias in the PUF, say a first portion of the PUF response has a different bias as a second portion of the PUF response (e.g. one half of responses is biased to 0, the other half to 1), then this method might not be able to remove that, i.e. the "debiased" bit string would still have the same location-based bias. Embodiments shown below do not suffer from this weakness since they debias locally.

Device 100 comprises a key reconstruction unit 150. The key reconstruction unit 150 is arranged to determine the cryptographic key from bits in the second noisy bit string marked as retained by the debiasing data. The cryptographic key being independent from bits in the second noisy bit string marked as discarded by the debiasing data. For example, key reconstruction unit 150 may be arranged to select from second PUF response 114 the bits marked as retained by debiasing data 142, ignoring bits marked as discarded.

Note that key reconstruction unit 150 does not perform a new debiasing operation, which could result in a new selection which may be quite different than the original selection. As a result it would not be possible to derive the same key during enrollment and reconstruction, or among different reconstructions phases. Instead reconstruction unit 150 applies the debiasing data obtained during the enrollment phase. For example, the debiasing data may stored, e.g., locally at device 100, or externally, say in a server which may be connectable to device 100, say over an electronic data connection.

Cryptographic device 100 may be extended with noise-reduction. For example, any conventional fuzzy extractor for noise reduction may be applied to the retained bits.

For example, cryptographic device 100 may comprise a noise-reduction unit arranged to determine noise-reduction data for bits in the first noisy bit string marked by the debiasing data as retained during the enrollment phase, and an error corrector arranged to reduce noise in the bits in the second noisy bit string marked as retained by the debiasing data during the reconstruction phase in dependence on said noise-reduction data.

Figure 3:
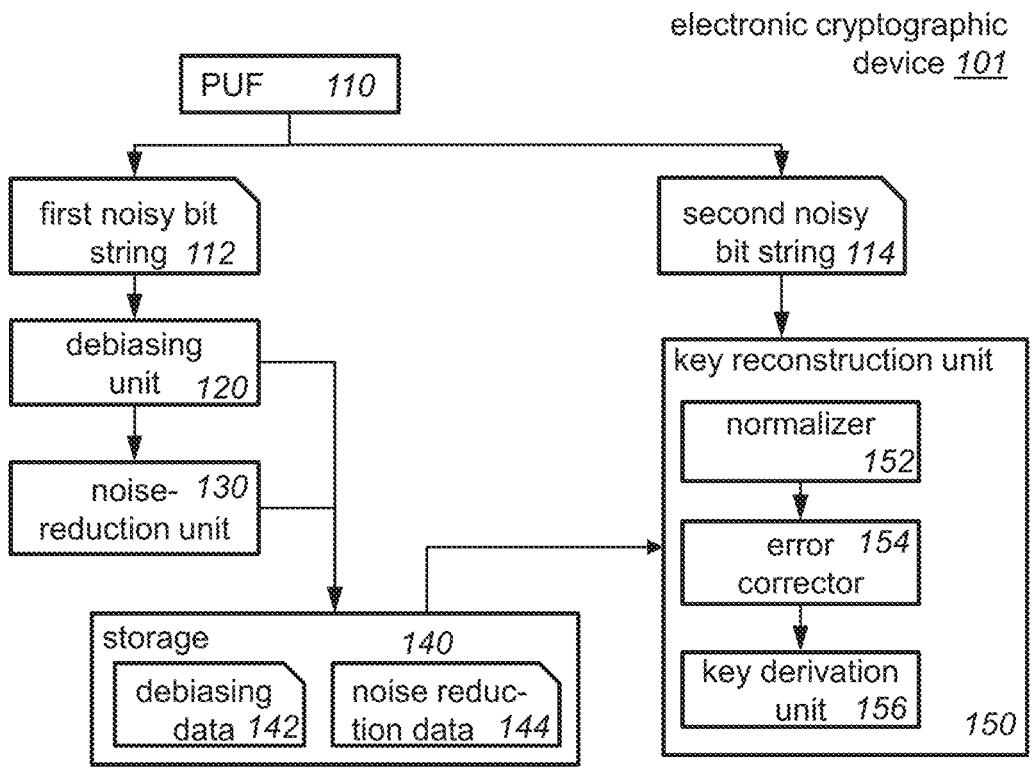

FIG. 3 schematically shows an example of an embodiment of an electronic cryptographic device 101. Electronic cryptographic device 101 is refinement of device 100 and includes noise reduction.

Like electronic cryptographic device 100, device 101 comprises a PUF 110 producing a first noisy bit string 112, a second noisy bit string 114, a debiasing unit 120 producing debiasing data 142, and a key reconstruction unit 150.

Device 101 comprises a noise-reduction unit 130. Noise-reduction unit 130 is arranged to obtain one or more first code words from a first error correcting code and to determine noise-reduction data 144 for bits in the first noisy bit string marked by the debiasing data as retained from the one or more code words. Noise reduction data is determined during the enrollment phase.

Device 101 comprises a normalizer 152, e.g., as part of key reconstruction unit 150. Normalizer 152 is arranged to apply noise-reduction data to bits in the second noisy bit string marked as retained by the debiasing data during the reconstruction phase, determining the one or more first code words together with noise.

Device 101 comprises an error corrector 154 arranged to correct said one or more noisy first code words obtaining one or more corrected code words. The error corrector 154 may be arranged for multiple round of correcting.

Device 101 may comprise a key derivation unit 156. Key derivation derives a cryptographic key from output of error corrector 154. For example, key derivation unit 156 may apply a key derivation function to one or more corrected code words. Alternatively, key derivation unit 156 may apply a key derivation function (KDF) to the decoding of one or more corrected code words, or to the corrected retained PUF response bits. Examples of such key derivation functions include KDF1, defined in IEEE Std 1363-2000, NIST-SP800-108 and 56-C, and similar functions in ANSI X9.42, etc. The key derivation function may be a hash function.

Optionally, device 101 comprises a storage 140, say a non-volatile memory, say a Flash memory, for storing debiasing data 142 and noise-reduction data 144. Instead of a storage 140 comprised in device 101, an embodiment stores debiasing data 142 and noise-reduction data 144 externally. Debiasing data 142 and noise-reduction data 144 may be combined into a single bit string.

One way to determine noise reduction data is, the so-called Code-Offset method based on error-correcting codes. The combination of normalizer and error corrector is sometimes referred to as a fuzzy extractor. Key derivation may also be included in the fuzzy extractor.

For example, in the enrollment stage, one or more random code words are selected from a block code, e.g., by encoding a randomly selected seed, and the difference between the code words and the bits of the first PUF response marked as retained is calculated. The first PUF response is also referred to as the enrollment response; the one or more random code words as the enrollment code words.

The retained part of the first PUF response may be padded or shortened if needed to make the retained part a multiple of the code word size.

The difference is also referred to as the offset. In case of binary values, the offset between two vectors may be obtained by the exclusive-or (XOR) operation. This code offset may be used as the noise-reduction data. In an embodiment, the noise reduction data 144 comprises the offset, e.g., the XOR of the retained part of the first PUF response and one or more code words.

In the reconstruction stage, the PUF is reevaluated and a noisy version of the enrolled PUF response is obtained, i.e., the second PUF response. By shifting the retained part of the second PUF response by the code offset contained in nose reduction data 144, one lands on a noisy version of the enrollment code words. In case of binary values, this shift again reduces to an XOR-operation. The noisy code words can be corrected using an error correction algorithm corresponding to the error correcting code from which the enrollment code words were taken. Given that the number of PUF response bit errors during reconstruction is not too large, the corrected code words will be equal to the originally enrolled code words.

If desired, one may reconstruct the retained part of the originally enrolled PUF response by shifting this corrected code word once more with the code offset. From this response, the enrolled key can consequentially be extracted. Alternatively, the key may be obtained from the corrected code words without reconstructing originally enrolled PUF response. It is also possible to decode the corrected code words, to derive the key from, possibly after one or more further rounds of decoding.

If the error correcting block code underlying a code-offset fuzzy extractor has dimension k and length n (also denoted as an (n, k)-code), then it can be shown that the noise reduction data disclosure is upper bounded by (n−k). If the noise-reduction data were computed for the first PUF response, without applying debiasing, the entropy remaining for key extraction is hence at least $H(X)-(n-k)$, wherein the first PUF response X has entropy $H(X)$. For certain simple code constructions (in particular codes of small dimension k, e.g., repetition codes), the noise-reduction data disclosure can be calculated more accurate and tighter upper bounds can be determined.

Note that the code parameters (n, k) are determined by the required error-correction capacity for the code. A larger error-correction capacity typically leads to codes with a lower rate k/n. Codes that need to be able to correct many errors will have n≫k, and hence the noise-reduction data disclosure upper bound (n−k) becomes very large. As a result, the effective noise-reduction data disclosure for such codes will typically also be very high, resulting in very little or even none remaining entropy for key extraction. Unfortunately, bias reduces $H(X)$ so the lower bound on the remaining entropy, i.e. $H(X)-(n-k)$, may be close to 0, or even negative. This clearly illustrates the key leakage problem.

There are alternative ways to construct noise reduction data than the code-offset method. For example, the PUF output may be regarded as the data bits for which parity bits are computed according to an error correcting code. The parity bits are stored as noise reduction data. To reconstruct the PUF response, the same parity bits are computed and stored with the stored parity bits. From the difference in parity bits, the difference between the first and the second noisy PUF response bits can be decoded, and the first PUF response can be reconstructed by correcting the second PUF response accordingly. This construction is sometimes referred to as syndrome-construction helper data. This may be combined with debiasing. For example, the parity bits may be computed for bits that have been marked as retained. During reconstruction, parity bits may be appended to bits of the second PUF response marked as retained.

In embodiments of the electronic cryptographic device the debiasing unit first debiases a possibly biased PUF response before computing noise-reduction data, e.g., before enrolling it. The debiasing operation will induce a certain loss of entropy of the PUF response, comparable to the length reduction of the first PUF response. This may be called the debiasing loss. However, by enrolling the resulting debiased PUF response, there need not be additional key leakage due to bias in the PUF response anymore. Conceptually, one could state that the entropy reduction due to bias in the PUF response is absorbed by the debiasing loss, and as a result the key leakage due to response bias is reduced, or removed.

If one assumes that bias is the only cause of reduced response entropy, then the debiased PUF response may have full entropy and there will be no key leakage whatsoever. However, there may be other causes of reduced entropy than bias, e.g., bit correlations. Bias appears to be an important cause of entropy reduction in PUF responses.

Discarding bits of the PUF response has a cost. This cost, referred to as the debiasing loss, comes on top of the loss due to noise-reduction data disclosure. The size of the PUF, e.g., the number of response bits, may need to be increased accordingly to compensate for this additional loss. Note that the debiasing loss can be significantly larger than only the entropy reduction due to bias. For example, when one applies debiasing on an already unbiased response, the entropy reduction of the PUF response due to bias is zero (since it is already unbiased), but the debiasing loss will typically be larger than 0.

Figure 4A:
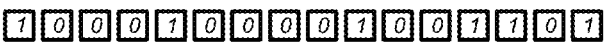
Figure 4B:

FIG. 4a schematically illustrates an enrolment phase in an example of an embodiment of an electronic cryptographic device. FIG. 4b schematically illustrates a reconstruction phase in an example of an embodiment of an electronic cryptographic device. The method disclosed with reference to FIGS. 4a and 4b may be performed by embodiments of electronic cryptographic device 101 or 100.

Shown in FIG. 4a is a first PUF response 412, e.g., as produced by PUF 110. PUF 110 may be biased, e.g., having a different probability of 1 and 0 bits, and noisy, e.g., producing slightly different responses when challenged multiple times.

First noisy bit string 412 may be regarded as a sequence of bit pairs. This is indicated in FIG. 4a by a series of horizontal curly braces.

For convenience the bits in a bit string may be associated with an index, e.g., by assigning the integers to the bits in the bit string, e.g., starting at 1. The first response may be partitioned into bit pairs, by having the bits index with $2i-1$ and $2i$ in the same bit pair i. A bit pair that comprises two equal bits is called an equal bit pair. A bit pair that comprises two unequal bits is called an unequal bit pair. Bit pairs need not necessarily be consecutive in the PUF response.

Debiasing unit 120 may be arranged to identify unequal bit pairs in the first sequence of bit pairs and to mark the unequal bit pairs in the first noisy bit string as retained. In an embodiment, the debiasing unit is arranged to mark all equal bit pairs as discarded in the debiasing data. The latter is not necessary though, as explained below. Below the sequence of bit pairs 412, the bit pairs identified as unequal or equal are indicated. Note that both bits of a retained bit pair are retained.

In an embodiment, the bits of the first PUF response are divided in consecutive pairs which are debiased by selecting unequal bit pairs and discarding equal bit pairs. The unequal bit pairs are considered as a whole. The result is shown in FIG. 4a as the debiased first PUF response 414.

Note that that the bit pairs in the debiased first PUF response 414 are all unequal. As a result the entropy of string 414 is the same as would be obtained by taking, say, only the first bit of each pair. However, bit string 414 has the advantage that better noise reduction is obtained when considered in combination with the error-correcting code selected for the noise-reduction unit. Moreover, even though the debiased PUF response 414 is not yet of full entropy, there will be no resulting key leakage by the noise reduction data anymore. Entropy may be concentrated later, using, e.g., a key derivation function.

One or more first code words 415 from a first error correcting code are obtained, e.g., by noise-reduction unit 130. Preferably, the code words of the error correcting code have an even length. If needed some bit pairs of debiased response 414 may be discarded, or debiased response 414 may be padded, say with zero bits, so that the number of bits in the one or more first code words equals the number of bits in the debiased bit string 414. In the example, shown in FIG. 4a, two code words are taken from a repetition code of length 4. The repetition code has (n, k) type (4, 1). Bits belonging to the same code word are indicated with a dashed box.

Repetition codes have very high error correction capabilities and are efficiently decodable. However, other codes are possible, e.g., Hadamard codes, BCH codes, etc.

First code words 415 may be generated by encoding the bits of a random enrollment seed, e.g., by using an error correcting encoder associated with the error correcting code for mapping uncoded, e.g., plain, data words to code words. Some embodiments obtain the first code words by encoding the bits of one or more second code words from a second error correcting code. The second code words may be generated by encoding the bits of a random enrollment seed, etc. Using two codes has the advantage of obtaining a high capacity for error correcting, yet with efficient encoding and decoding.

In an embodiment, noise-reduction data 144 is obtained, e.g., by noise-reduction unit 130, that comprises a difference between the bits in first bit string 412 marked by the debiasing information as retained, e.g., the bits shown in debiased string 414 and the one or more code words 415. The difference may be obtained by an XOR operation.

However, the difference between the bits in the first bit string marked by the debiasing information as discarded and bits in the one or more code words corresponding to discarded bits in the first noisy bit string is not obtained. The noise-reduction data does not comprise the latter differences. Thus, biased parts of the first PUF response do not leak.

In an embodiment, the noise-reduction data comprises a difference between a concatenation of the bits in the first bit string marked by the debiasing information as retained and the one or more code words.

There are a number of ways to encode the debiasing and the noise reduction data. FIG. 4a shows debiasing and noise-reduction data 440 which combines both data into a single bit string. Each bit of the one or more code words corresponds to a retained bit of the first bit string. For example, the one or more code words 415 together form a string in which the 1, 2, 3, 4, 5, 6, etc, bit correspond to the 1, 2, 5, 6, 9, 10, etc, bit of first response 412. Indices in bit string 440 that correspond to a retained bit store a difference between the bit in the first PUF response with the same index and the bit of the one or more code words corresponding to said retained bit.

For example, the bit pair marked 'a' corresponds to a difference between the first two retained bits of string 412 and the first two bits of the one or more code words 415.

Bit pairs in string 440 that have an index of a bit that is discarded may be filled with an all-zero bit pair. Alternatively an all-one pair may also be used. For example, the bit pair marked 'b' is all zero. The equal bit pairs in string 440 mark discarded bit pairs. The unequal bit pairs of string 440 contain noise-reduction data.

In an embodiment, the combined debiasing and noise reduction data 440 may have the same length as the original biased first PUF response 412.

There are many alternative ways to record this information; a few of which are shown in FIG. 4*a*. For example, debiasing data 442 is a bit mask in which one-bits indicate, e.g., point to, retained bits, and zero-bits indicate discarded bits. For example, debiasing data 442' is a list of indices, in this case of the retained bit pairs. Noise reduction data 444 is bit string that only contains the noise-reduction data. Noise reduction data 444 may be used after the retained bits have been identified using, say, strings 442 or 442'. For clarity, noise reduction data 444 has been drawn under the corresponding bits; however they may be stored in concatenated form.

The debiasing data and the noise reduction data may be stored, say in storage 140, or stored externally, say, on an external server (not shown).

In the reconstruction phase a second PUF response 422 is produced by the same PUF that produced first PUF response 412, say by PUF 110. The second PUF response is close, say in hamming distance, to first response 412; however there is an amount of noise. Some of the bits in second response 422 differ from response 412. The different bits in the example shown in FIG. 4*b* are indicated with an arrow.

The second PUF response 422 is partitioned into bit pairs. Bit pairs are discarded which are marked as discarded in the debiasing data. For comparison, data 440 has been shown below second response 422, in which the zero bits pairs indicating discarded bit pairs are offset. The bits marked as retained form debiased second PUF response 423.

Note that the bias may be slightly different during production of the second response, than during production of the first response, say due changes in the environment, e.g., temperature. This is of less importance however since noise-reduction data is not produced for the second PUF response, so no additional key leakage takes place.

The bit pairs of the debiased PUF response 423, i.e., the bits marked as retained, are XOR-ed with the noise reduction data, resulting in noisy code words 424. For example, normalizer 152 may add, e.g., XOR, the noise-reduction data to bits in the second noisy bit string marked as retained by the debiasing data.

The noisy code words 424 are the one or more first code words 415 with noise added in. If no noise were present, the noisy code words 424 would be identical to code words 415. In the example, in FIG. 4*b*, both code words contain an error.

The noisy code words 424 may be corrected, say, by error corrector 154, obtaining corrected code words 426. Error corrector 154 could continue to decode the corrected code words 426 to obtain one or more decoded code words 427. In this case, the decoded code words are a single bit per codeword, as this is a k=1 code. This decoding step is not necessary though.

In an embodiment, the key could be directly taken as decoded code words 427. However, it is preferred to apply a key derivation function, either to the decoded code words 427 or to the corrected code words 426. The latter may be performed by key derivation unit 156.

Alternatively, the decoded bits 427 may be taken as the code bits of a higher-level code word in case of a concatenated code construction. In that case, the Hamming weight of the repetition code words can also serve as soft-decision information for the higher level decoder.

An advantage of the embodiment explained with reference to FIGS. 4*a* and 4*b* is that key leakage due to biased PUF responses has been removed because the PUF response is debiased before noise reduction data is computed. This debiasing fuzzy extractor may hence be used for key generation from biased PUFs without key leakage, or at least reduced key leakage.

Another advantage is the improved efficiency due to the fact that both bits of an unequal bit pair are considered. At first sight this is counterintuitive, since the resulting debiased PUF response is indeed unbiased, but no longer has independent bits since the parity of each pair of bits is odd. This results in reduced entropy for the debiased PUF response; the effective entropy is only half the length of the response. Classic von Neumann debiasing avoids this by also discarding the second bits of selected pairs.

However, here the intelligent combination of noise-reduction data disclosure and debiasing loss comes into effect. The fact that the parity of bit pairs in the debiased response is openly known is not a problem because this information is disclosed anyway through the repetition-code-offset noise reduction data. Note that the repetition-code-offset already discloses the parity of each combination of an even number of PUF response bits. From a security perspective, a hypothetical attacker cannot exploit the knowledge of these parities to attack the produced key material, since he gets the same information from the noise reduction data anyway. Since the key material provided by the fuzzy extractor is secure given the noise-reduction data disclosure, it will remain secure given this entropy reduction due to the disclosure of the bit pair parities. So there is no additional entropy loss by using both bits of a retained bit pair, but there is an improved error correction.

The entropy in the debiased PUF response may be concentrated in a key, say of half the length or less of the retained bits, e.g., by a key derivation function.

Because the code-offset noise-reduction data discloses the bit pair parity information anyway, it does not need to be subtracted a second time from the PUF response entropy by discarding the second bits of unequal pairs as the classic von Neumann debiasing does. For the same level of bias, the solution presented here hence retains twice the number of debiased bits when compared to the classic von Neumann debiasing. For example, when the original PUF response is already unbiased, classic von Neumann debiasing would retain on average ¼ of the bits (effective debiasing loss of ¾) whereas the embodiment shown in FIG. 4*a* would retain ½ of the bits (effective debiasing loss of ½). This reduction in effective debiasing loss is possible because part of the actual debiasing loss overlaps with the noise-reduction data disclosure and is hence no effective loss anymore.

The embodiments of FIGS. 4*a* and 4*b* effectively address the key leakage problem for biased PUF responses, and intelligently combine the debiasing loss with the noise reduction data disclosure which results in a significant improvement.

A noise-reduction unit may be arranged to determine noise-reduction data for debiased PUF response 414 during the enrollment phase, an error corrector may be arranged to reduce noise in the bits in debiased PUF response 423 during the reconstruction phase in dependence on said noise-reduction data. For example, the noise-reduction data may be used to map a debiased PUF response to noise code words, say by a normalizer.

Figure 5A:
Figure 5A:
Figure 5B:
Figure 5B:
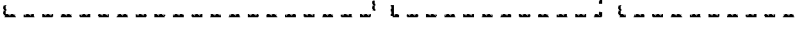

FIG. 5a schematically illustrates an enrolment phase in an example of an embodiment of an electronic cryptographic device. FIG. 5b schematically illustrates a reconstruction phase in an example of an embodiment of an electronic cryptographic device. The method disclosed with reference to FIGS. 5a and 5b are based on those discussed with reference to FIGS. 4a and 4b, they may be performed by embodiments of electronic cryptographic device 101 or 100.

Like in FIG. 4a enrollment includes producing a first PUF response 512, which is regarded as a sequence of bit pairs. Unequal bit pairs are identified, say by debiasing unit 120, and marked as retained. Unequal bit pairs have been marked with an unequal sign at reference 513a. Among the equal bit pairs, a first and second equal bit pair is identified in the sequence of bit pairs, the first equal bit pair being the inverse of the second equal bit pair, e.g., by debiasing unit 120.

For example, debiasing unit 120 may be arranged to identify the first equal bit pair in the first PUF response 512, and to identify the next equal bit pair in the first PUF response 512. If the first equal bit pair equals the next equal bit pair, then both are marked as discarded; if not at least the first equal bit pair is marked as retained. Debiasing unit 120 may be arranged to repeatedly find the next two equal bit pairs, and to discard them both if they are equal, but to retain at least the first pair if the two pairs are unequal.

In an embodiment, the debiasing occurs in multiple rounds, in a first round unequal bit pairs are marked as retained and equal bit pairs are marked as discarded. In a second round the equal bit pairs which were discarded by the previous round are now reconsidered in a second round of debiasing. The discarded bits are grouped in quadruples. Quadruples of the form (0, 0, 1, 1) and (1, 1, 0, 0) may be retained and added to the debiased PUF by marking them as retained; quadruples of the form (0, 0, 0, 0) and (1, 1, 1, 1) are still discarded.

Since the debiased PUF response now comprises of a list of pairs and quadruples (in a random order), it could be that the end of an even-length repetition code word does not align with the end of a quadruple. However, the security of this embodiment improves if the bits of a single selected group (pair, quadruple, . . . , etc) are always used within the same code word (such as a repetition code word). The reason is that if a bit selection (e.g. a quadruple) is used across different code words, an attacker may exploit this to learn parities across these code words. In case of repetition codes, he may, e.g., learn if two consecutive repetition code words are the same or different. This leads to a loss of entropy and hence key leakage.

To ensure that the bits of a single selected group (pair, quadruple . . . ) are always used within the same code word, possibly trailing bits of a group that fall of a repetition code word may be discarded. In the example of FIG. 5, this happens at the end of the example PUF response (at 'e'): for the last selected quadruple, only the first bit pair can be used for the current repetition code word. In this case, the last bit pair of that quadruple should be discarded, it cannot be used as the start for the next repetition code word.

In an embodiment both bits of an unequal pair of bits are marked retained. However, in an embodiment the second equal bit pair in a pair of equal bit pairs is only marked as retained by the debiasing data if the first and second bit pair are used in a difference with the same code word of the one or more code words and as discarded otherwise.

The first code words 515 are shown in FIG. 5a. The bits of the first code words are aligned with the corresponding retained bits of first response 512, that is, with the bits with which a difference will be computed.

The first two equal bit pairs in first response 512 are referenced with 'c'. As they are both equal, in this case, both 0, they are both discarded. The second two equal bits pairs are referenced with 'd'; the two pairs are unequal so at least the first pair is retained. As the second pair corresponds with bits in the same code word as the first pair, the second is also retained. The third pair is referenced with 'e'; the two pairs are unequal so at least the first pair is retained. As the second pair corresponds with bits in a different code word as the first pair, the second is discarded. Note at in the debiased first PUF response 514, i.e., the retained bits of first PUF response 512, that all four bits of the retained pair of equal bit pairs are retained if they fall in the same code word; but at 'g' that only the first bit pair is retained if they do not. Two zero bits may be appended to debiasing data 542 to indicate that the final two bits of first response 512 are discarded, e.g., if more code words follow.

Alternatively to discarding trailing bits of a group, groups could be reordered, e.g., so that the end of a group (pair, quadruple or set) always aligns with a repetition code word end. For example, the debiasing unit 120 may select a permutation, also referred to in the claims as the first permutation, of the bits in first PUF response 110 and store the permutation as part of debiasing data 142. When reconstructing the key, the permutation would first be applied to the second PUF response, e.g., by the reconstruction unit, after which debiasing and denoising proceeds as described herein. For example, said permutation may place groups larger than pairs, say quadruples, at the start of code words; this avoids trailing bits (not shown in the figure). In an embodiment, the debiasing unit is arranged to determine a permutation of the first sequence of bit pairs so that the first and second equal bit pair are used in a difference with the same code word of the one or more code words. Permuting has the advantage that more bits of the first PUF response may be used to produce noise reduction data, and thus decrease the debiasing loss.

The debiasing method above which identifies bit pairs or quadruples, may be extended to more than two rounds. A third round which works on octuplets (8 bits) can be added straightforwardly, etc. for more rounds. This will reduce the debiasing loss even further. However, the additional gain of adding more rounds will quickly become very small. For example, a first round may identify unequal bit pairs. A second round may identify among the remaining pairs, unequal quadruples. A third round may identify among the bit pairs not yet retained after the second round unequal octuplets.

For example, in an embodiment, the debiasing unit is arranged to identify a first and second set of equal bit pairs in the sequence of bit pairs, the first and second set having the same size, all equal bit pairs in the first set being the same, all equal bit pairs in the second set being the same, bit pairs of the first set being the inverse of the bits pairs in the second set, the debiasing data marking at least the equal bit pair of the first set as retained.

The result of the additional selections is a debiased first PUF response 514. First PUF response has smaller debiasing loss than the method of FIG. 4a has, because some of the equal bit pairs are retained. Like in FIG. 4a, first code words 515 are obtained. In the example of FIG. 5b a 6 bit repetition code is used. A possible representation of debiasing data 542 is shown in FIG. 5a. Debiasing data 542 uses one-bits to indicate retained bits and zero bits to indicate discarded bits. Each bit of the one or more code words 515 corresponds to a retained bit in the first PUF response 512. Noise-reduction data 544 contains differences between retained bits and the corresponding bits of the one or more code words 515. The noise reduction data 544 may be stored so that the index of a bit in noise reduction data 544 that represents the difference between a first response bit and a code word bit is the same the index of said first response bit in the first response. The remaining bits in data 544 may be arbitrary, e.g., randomly filled, set to zero, left empty, etc; in FIG. 5a, they are filled with 0.

Note that in FIGS. 4a and 5a each bit of the one or more code words (e.g., 415, 515) corresponds to a retained bit in the first PUF response; the noise reduction data comprising the difference between the retained bits and the corresponding code word bit.

The reconstruction phase illustrated by FIG. 5b is largely the same as for FIG. 4b. A second PUF response 522 is obtained, e.g., from PUF 110; bit errors with respect to the enrolled response are marked with an arrow for elucidation purposes. From this response 522 retained bits are selected using the debiasing data, obtaining debiased second PUF response 523. The debiased second PUF response 523 is added to the noise reduction data obtaining noisy code words 524. As in FIG. 4a, the corrected code words may be decoded to obtain decoded code words 527. Alternatively, the code words may be used directly, say by hashing them, etc.

Note that debiasing data 542, 442, noise reduction data 544, 444, but also combined data 440 have a rather high level of structure and can consequentially be compressed for more efficient processing and communication.

For example, if a repetition code is used for the first code and if a bit pair is selected by the first round of debiasing, then the corresponding noise reduction data bit pair will always have an odd parity and can hence be represented by a single bit, resulting in a 50% compression for that pair. Similar compressions are possible for the code-offset noise-reduction data of quadruples.

The debiasing illustrated by FIGS. 5a and 5b has all the advantages of the method illustrated with FIGS. 4a and 4b and moreover has an improved efficiency since the debiasing loss is reduced further. This reduction comes from the fact that some of the bit pairs which were discarded by the basic extractor are now retained.

Note that selected quadruples in the second round can again be used as a whole, instead of only a single bit. That is, all bits of a retained pair of equal bit pairs are marked as retained. Each selected quadruple of bits effectively only contains one bit of information, so there is an entropy reduction of three bits. However, this reduction again overlaps completely with the information that is disclosed by the repetition code-offset noise-reduction data and hence does not need to be subtracted a second time. In other words, also for the selected quadruples, the debiasing loss and the repetition code-offset noise-reduction data disclosure are combined.

FIG. 6a schematically illustrates an enrolment phase in an example of an embodiment of an electronic cryptographic device. FIG. 6b schematically illustrates a reconstruction phase in an example of an embodiment of an electronic cryptographic device. The method disclosed with reference to FIGS. 6a and 6b may be performed by embodiments of electronic cryptographic device 101 or 100.

The methods of FIGS. 4a and 5a has vulnerability for a special attack scenario, which we refer to as the multi-enrollment disclosure problem.

The multi-enrollment disclosure problem arises when the same PUF is used more than once in a debiasing code-offset fuzzy extractor. The enrolled PUF responses are hence equal up to some random bit errors. For example, an attacker manipulates a device so that debiasing and noise reduction data is computed twice for the same PUF.

The underlying cause of the multi-enrollment disclosure problem is the fact that the debiasing step is stochastic, i.e., debiasing the same PUF twice results in two different debiasing selections which are random up to a certain point; different bits, having different indices are retained. The randomness of the debiasing selection is caused by the noise on the PUF response. Due to this stochastic nature, the debiased PUF responses in both enrollments can be based on different selections of the original PUF response. Consequentially, also the debiasing loss and noise-reduction data disclosure in both enrollments will disclose different parts of the original PUF response entropy. As a result, the combined information disclosed by the noise-reduction data and the debiasing loss of both enrollments is larger than that of one single enrollment.

The multi-enrollment problem need not arise in some embodiments. For example, enrollment may be done at a safe location, e.g., requiring some equipment that is only available there. For example, a device may be arranged to prevent more than one enrollment based on the same PUF. This may be done by storing the enrollment state of the PUF, say by means of a one-time programmable (OTP) memory element (e.g. a fuse is blown when the PUF is enrolled).

In FIGS. 6a and 6b embodiments are illustrated which debias a PUF response with reduced vulnerability to the multi-enrollment disclosure problem. Embodiments of FIGS. 6a and 6b built upon those of FIGS. 4a and 4b.

Shown in FIG. 6a is a first PUF response 612, which is regarded as partitioned into a sequence of bit pairs. Within the bit pairs equal and unequal bit pairs are identified, say by debiasing unit 120. Pairs of unequal bits are retained, pairs of equal bits are discarded. Both bits in a retained bit pair are retained.

Different from FIGS. 4a and 5a the discarded bit positions continue to play a role during enrollment. Conceptually, the discarded pairs of equal bits are replaced by a pair of erasures symbols ($\varepsilon$). An erasure can be considered as a special third symbol (different from 0 and 1). Below, various ways to implement the erasure symbol are discussed. For example, the symbols 0, 1, and $\varepsilon$ may be encoded with two bits each. Alternatively, the effect of the erasure symbols may implemented by storing a list of indices indicating erasure symbol locations, etc.

The resulting debiased first PUF response 614 is shown in FIG. 6a. The resulting debiased first PUF response 614 comprises pairs of unequal bits, and pairs of erasure symbols. The debiased PUF response 614 is of the same length as the original biased PUF response 612; taken into account however that debiased PUF response 614 is over the larger alphabet having three symbols rather than two.

One or more first code words 615 from a first error correcting code are obtained, say by a noise-reduction unit 130. As noted for FIGS. 4a and 5a, the first error correcting code may be obtained by encoding the bits of one or more second code words from a second error correcting code. This latter option was used in FIG. 6a, and will be further discussed below with reference to FIGS. 6c and 6d. In FIG. 6a, again a repetition code is used as an example. Other error correcting codes may be used instead however. The first error correcting code is preferably an even length code; in the (n,k) notation, n is even. Note that odd codes may also be used, e.g., by adding a padding bit to debiased string 614 for each code word, or by discarding one bit of each code word, etc. The padding bit may be zero.

In FIG. 6a, each bit of first PUF response 612, and of debiased PUF response 614 correspond to a bit of the one or more code words 615. This is an important difference with the FIGS. 4a and 5a, in which there was only a correspondence between retained bits of the first PUF response, whereas in FIG. 6a there is a correspondence between all bits, both retained and discarded, of the first PUF response and the bits of the one or more code words 615. This means that any bit of first PUF response 612 will be used in the same code word, even across different enrollments.

Combined debiasing and noise reduction data is obtained by determining the difference between the debiased first PUF response 614 and the one or more code words 615. In the example of FIG. 6a the code is a length 6 repetition code; other error correcting codes are applicable though, say a Hadamard, BCH, etc.

Combined debiasing and noise reduction data is obtained by obtaining the difference, say XOR-ing the debiased PUF response 614 with the one or more code words 615. The XOR-operation is extended to allow for the additional erasure symbol E. We will sometimes refer to the extended XOR as the ε-XOR operation: when operating only on 0's and 1's, the ε-XOR operation is the same as the XOR operation, but when one of the operands is E, then the result will always be ε regardless of the other operand. So, ε-XOR(0, 0)=ε-XOR(1, 1)=0, and ε-XOR(0, 1)=ε-XOR(1, 0)=1, and ε-XOR(ε, 0)=ε-XOR(ε, 1)=ε.

If an even length error correcting code is used, as is preferred, there will always be a whole number of pairs of the debiased PUF responses (no trailing bits). In FIG. 6a, debiasing and noise-reduction data 640 shows the result of the ε-XOR operation on the debiased PUF response 614 and the one or more code words 615.

Instead of skipping bits from the first PUF response, as is done in FIGS. 4a and 5a so that each code word of the one or more code words is combined with a full set of bits, in FIG. 6a bits are erased from code-words if they correspond to discarded bits, as indicated by the erasure symbol. In embodiments according to FIG. 6a there is a fixed one-to-one correspondence between bits of the first PUF response and the bits of the one or more code words; marking a bit as discarded or retained does not change the relationship.

The combined debiasing and noise reduction 640 has the same length as the original (biased) PUF response 612. Any representation of the 0, 1, and ε-symbol in a binary format may be used to encode string 640. Due to structure in the string 640, it can be considerably compressed when desirable for ease of operation and communication. Compression may use a compression format specific for string 640, but any non-lossy compression algorithm may be used.

Although the erasure symbol is conceptually easier to understand, it is nevertheless possible in embodiments to avoid the use of an additional symbol. For example, FIG. 6a shows as an alternative to combined noise and debiasing data 640, debiasing data 642 and noise reduction data 644.

Debiasing data 642 indicates which bits in the first noisy bit string are marked as retained or discarded. In the case of FIG. 6a, Debiasing data 642 is a bit mask, in which 1 bits indicate retained bits and 0 bits indicate discarded bits. In this case a discarded bit may be regarded as an ε symbol. Noise reduction data 644 comprises the differences of the retained bit and the corresponding bits of the one or more code words. In the example, of FIG. 6a, noise reduction data 644 stores the difference the differences of the retained bit and the corresponding bits as the same index as the index of the retained bit in the first noisy response 612; bits in noise reduction data 644 corresponding to discarded bits may be filled arbitrarily, in this case with 0, or left empty. Noise reduction data 644 does not contain differences between code word bits and discarded bits.

In an embodiment, bits in the first noisy bit string, bits in the one or more code words and bits in the noise-reduction data all have an index. For the purpose of the index the one or more code words are regarded as one long string, e.g., by concatenating the code words. All three strings may be the same length, or made to be the same length, e.g., by padding the first noisy PUF response. The indices may conveniently run from 1 to n, etc. The difference between bits in the first PUF response and bits with the same index of the one or more code words is stored in noise reduction data; for example, at bits with the same index. Bits in the noise reduction data with an index that is the same as a discarded bit in the first PUF response may be set to zero, to one, or randomly filled, etc.

Debiasing and noise reduction data may be obtained as follows: For each bit pair in the first PUF response identify the bit pair as equal or unequal. If the bit pair is equal, mark the bit pair as discarded in the debiasing data. If the bit pair unequal compute the difference, e.g. XOR, between the bit pair in the first PUF response and a corresponding bit pair in the one or more code words and store the difference in the noise reduction data, e.g., at a bit pair at a corresponding location. For example, debiasing data, e.g., debiasing data 642 and noise reduction data, e.g., noise reduction 644 may be obtained by the following algorithm (denoted in pseudo code):

for i=1 to the number of bit pairs in the first PUF response
  if bit pair i is equal, mark bit pair i as discarded in the debiasing data
  else compute the difference, e.g., XOR, between bit pair i in the first PUF response and bit pair i in the one or more code words and store the difference in the noise reduction data.
next;

Bit pair i may be regarded as bits $2i-1$ and $2i$ (counting starting from 1). Bits in the first noisy bit string may correspond to bits in the one or more code words that have the same index. Storing a bit in the noise reduction data may be done by appending the difference bit pair. Alternatively, storing a bit in the noise reduction data may be done by storing the difference at the corresponding bit pair locations, etc. Marking a bit pair as discarded may be in a number of ways, e.g., by listing the index in a list, by marking the bits, or the bit pair in a bit mask, etc.

The reconstruction stage may operate as follows, following FIG. 6b. Shown is a second PUF response 622, in which differences with the enrollment PUF response 612 are indicated with arrows. Below second PUF response 622 the debiasing and noise-reduction data 640 that was generated during the enrollment stage is shown again.

The noisy second PUF response 622 is added taking account of the erasure symbols, here by using the ε-XOR with the debiasing and noise-reduction data 640, resulting in debiased and normalized second PUF response 624. Note that debiased second PUF response 624 contains erasure symbols ε for each bit corresponding to an erasure symbol in the debiasing and noise-reduction data 640.

The bit string 624 can be regarded as one or more code words affected both by noise and by erasures. An erasure symbol in an error correcting code can be regarded as a type of noise for which the location is known. Like the situation in FIGS. 4b and 5b in which code words were corrected which were only affected by noise, also code words that are affected by noise and erasure may be corrected. As with any code, correction is only possible if the amount of noise and erasure is not too high. A PUF with a higher level of bias or noise may be corrected by using a more powerful error correcting code, e.g., having a higher minimum distance (d).

In the example of FIGS. 6a and 6b the first code words are a length six repetition code. Repetition code allow a relatively easy correction algorithm, however it is noted that more complicated error correcting codes also allow correction in the presence of noise and/or erasures. For a repetition code, a code word may be decoded by counting which of 0 and 1 is in the majority among the non-erased symbols. Note that if, there is no majority, the code word cannot be decoded; that is both a 0 or 1 decoded symbol are equally likely. If required the original code words 615 may be recovered, if needed, by encoding the decoding.

This latter type of decoding in which one particular decoding is decided upon for each code word is called hard decision decoding. The hard decoded code words 627 are shown in FIG. 6b. Note that for the second code word the hard decision was incorrect. For the third code word both 0 and 1 are equally likely. If a hard decision is required, a random choice could be made. Note that if the hard decision decoding happened, by chance, to select a 0 for the third code words, the resulting second code word (0,0,0,1) would be correctly corrected to (0,1,0,1). However, if the hard decision decoding happened, by chance, to select a 1, the number of errors would be too large for the second error correcting code to correct. A more powerful error correcting code could have prevented these errors; though likely at the cost of a lower code rate (the fraction k/n).

FIG. 6 illustrates another use of error correcting code, which was also mentioned for the embodiments illustrated with FIGS. 4a and 5a.

Shown in FIG. 6c is a second error correcting code, of which all code words 650 are listed. This example code is an (n,k,d)-type (4, 2, 2) code. For example, the second error correcting code may be a Reed-Solomon error correcting code. Shown in FIG. 6c are the decodings of the code words, also called seeds 630.

During enrollment one or more random code words may be selected from the second error correcting code 650. Alternatively, one or more random seeds may be selected from seeds 630 and encoded according to the second error correcting code. In case of FIG. 6a seed (0,1) was randomly selected and encoded to obtain the one or more (in this case one) code word (0,1,0,1). The bits of the one or more second code words are encoded according to a first error correcting code. Encoding the bits (0,1,0,1) according to a length 6 repetition code gives the one or more first code words 615.

During decoding this concatenated code construction may be used to advantage. Instead of hard decision decoding the noisy and erasured code words 624 a reliability information indicative of a reliability of the correcting of the one or more noisy first code words is computed, that is soft decoded code words 628. Soft decoded code words 628 give an indication of the reliability of the decoding. In this case, Soft decoded code words 628 indicate that a 0 is decoded by a negative value and a 1 decoding is indicated by a positive value. An undecidable decoding is indicated with a 0 value. The magnitude of the soft decoded code words 628 indicate the reliability of the correcting. A larger magnitude indicates a more reliable value. For a repetition code as is used in FIG. 6a both the expected decoding and the reliability of said decoding can be encoded in a single, e.g., positive or negative, integer. For more complicated first error correcting codes two values may be used for each code word, an expected decoding, e.g., multiple bits, and a reliability value, e.g., an integer.

In FIG. 6b, the soft decoding was obtained by counting 1-bits as +1 and 0-bits as −1, and ignoring erasures.

The reliability information indicative of a reliability of the correcting of the one or more noisy first code words may be determined by a reliability information extractor, which may be part of or combined with the error corrector. The reliability information extractor is not separately shown in FIG. 3. A soft decision decoder may be configured to decode the one or more second code words using the reliability information. The soft decision decoder may be a minimum distance list decoder. Alternatively, the soft decision decoder may a different type of soft decision decoding, e.g., a turbo decoder, a trellis-based decoder, etc. In an embodiment, the minimum distance list decoder is configured to compute a distance between the reliability information and each one of the second error correcting code words, and to select a minimum distance as the decoding.

The reliability information, also known as soft-decision information, may be used to decode the second code word. In the example of FIG. 6a, the soft-decision value is used to do a soft-decision decoding of the outer (second) code word. In the example, this is done by means of a minimum distance list decoder.

The closeness between second code word of the second error correcting code 650 may be obtained by computing the inner product, or dot product, between the soft decision information 628 and each one of the code words. The soft decision decoding, e.g., minimum distance, or maximum correlation decoding, is illustrated in figured 6d. For the inner product, O-bits are regarded as −1 values. The results of the correlations are shown at 651. Note that code word (0,1,0,1) has the highest inner product and is thus the most likely decoding. The closeness values may be converted to distance value, by subtracting them, e.g., from some maximum correlation value, in this case, the correlations are subtracted from 24. The distance values are shown at 652. Second code word code (0,1,0,1) has the minimum distance.

In this case the soft decision decoding returns the correctly decoded seed, despite the fact that two out of four repetition code words could not be correctly decoded.

The erasure-debiasing code-offset fuzzy extractor illustrated with FIGS. 6a and 6b have all the advantages of the debiasing illustrated with respect to FIGS. 4a and 4b and moreover do not suffer, or at least less so, from the multiple enrollment problem. Note that the erasures are independent from the efficiency of error correction; they neither contribute to the error-correction nor do they make it worse. It can also be observed that the debiasing loss in this case overlaps entirely with the noise-reduction data disclosure, since the loss induced by debiasing, e.g., the erasures, is also entirely contained in the code-offset noise-reduction data.

Importantly, the erasure-debiasing code-offset fuzzy extractor does not suffer from the multi-enrollment disclosure problem. The reason for this is that the debiasing procedure is no longer stochastic, since all bit pairs of the original PUF response are retained, either unchanged or as erasures. There can hence be no accumulated information leakage when multiple enrollments of the same PUF are considered.

The embodiments discussed address a bias that is independently distributed. That is, the embodiments appear to work best if the bias is uniform. Nevertheless, even some forms of non-uniform bias are addressed using the embodiments according to FIGS. 4-6. For example, if a first sequence of bits has a first bias and a following second sequence of bits have a second bias, than bias is addressed correctly. This is because these embodiments use local bit pairs to decide which bits to retain and which to discard. Possibly, in the area between the first and second sequence there may be some entropy loss. Thus having multiple zones with different bias levels does not seems be a great problem.

However, other forms of non-uniform bias may cause greater entropy loss. Consider for example, a PUF in which a bias level for bits with an odd index is different from bias for bits with an even index. Even after debiasing such a PUF may have a lower entropy than an otherwise similar PUF in which bias is not dependent on even/odd indices. Debiasing may be improved by performing a permutation before selecting the debiasing data; this permutation is also referred to as the second permutation. Note that generally, the second permutation will be performed before the first permutation.

For example, in an embodiment, debiasing unit 120 is arranged to permute the first noisy bit string by a second permutation to group bits in a first and second portion of the first noisy bit string together before marking bits in the first noisy bit string as retained or discarded, the first and second portion of the first noisy bit string having a first and second bias level respectively. The key reconstruction unit 150 is arranged to permute the first noisy bit string by the second permutation to group bits in the first and second portion of the first noisy bit string together before determining bits in the second noisy bit string marked as retained by the debiasing data.

For example, the first portion may be the even bits of the first or second noisy bit string, i.e., bits with an even index, and the second portion may be the odd bits, i.e., bits with an odd index; or vice versa. For example, the second permutation may permute all bits of the first portion to the front of the first or second noisy bit string. For example, a permutation may be represented as a vector, e.g., an array, of indices, each index of the indices pointing to a bit location. For example, the vector may be [0, 2, 4, 6, 8, 10, . . . , 2l, 1, 3, 5, 7, 9, . . . , 2l–1] to group even and odd bit locations together; here n=2 bits are used. In an embodiment, any code word is only subtracted from bits from only even bit locations or either only odd bit locations.

The second permutation may be included in the debiasing data. However, the second permutation may be chosen fixedly for a class of devices with similar PUFs, e.g., which share the same type of memory-based PUF. In the latter case the second permutation may be included pre-determined and, e.g., stored in the device. The second permutation may be included in an address decoder of the PUF that is used to read out the PUF.

Note that neither the first nor second permutation requires that bits are moved in the memory to a different location (although that is possible), but may also be implemented by addressing the bits differently. Different addressing may be done in software, e.g. using permuted addresses, or in hardware, e.g. using a permuting address decoder.

Figure 9A:
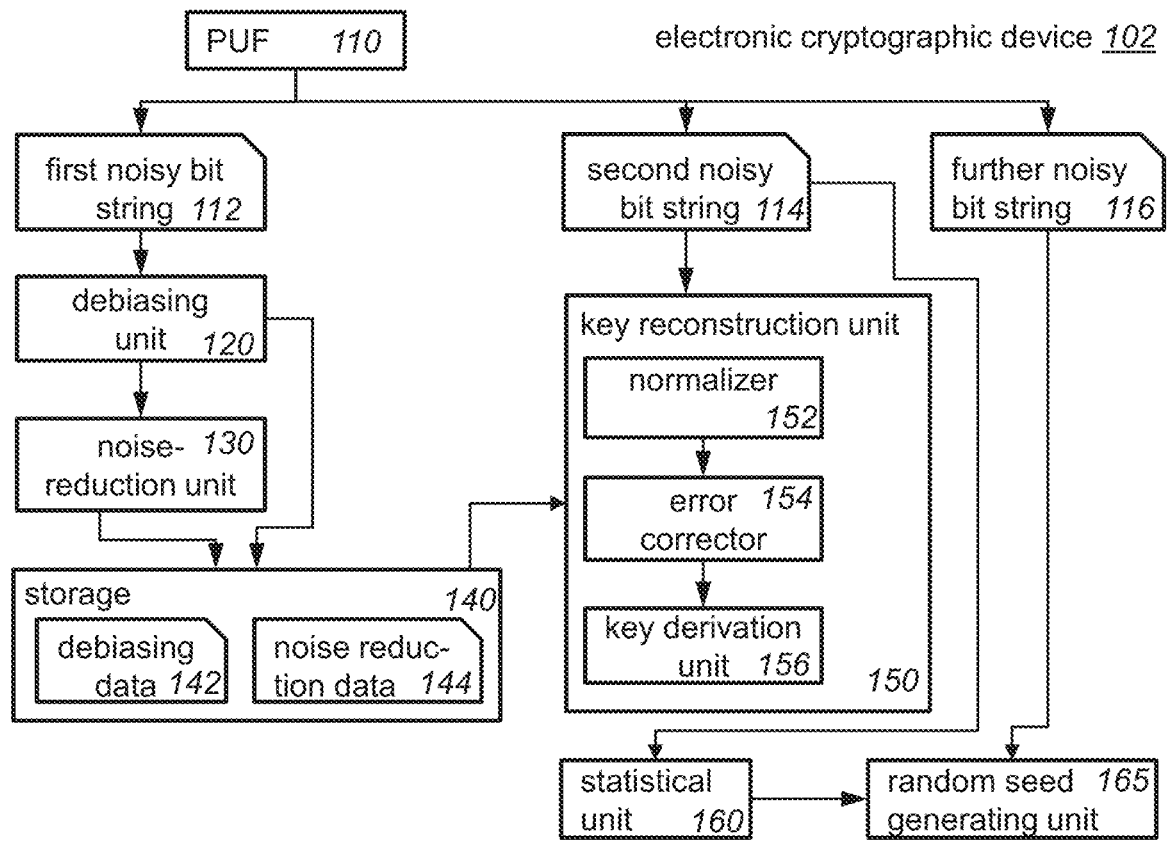

FIG. 9*a* schematically shows an example of an embodiment of an electronic cryptographic device 102. Cryptographic device 102 is the same as device 101 except as for described below.

Interestingly, a PUF response can be used for a two different uses. On the one hand, by suppressing the noise using helper data a PUF response can be used to produce a cryptographic key. On the other hand, the noise may be exploited by producing a random seed from a PUF response. In the first case the stability of the PUF response is used, in the second case its noise.

Unfortunately, it may happen that PUF 110 produces responses that are not within specification. For producing random number in particular the noise entropy of the PUF is important. Noise entropy is the entropy related to the amount of noise when repeatedly measuring the same PUF instance. This is important when using the PUF for random number generation. There must be enough randomness in repeated measurements to ensure high quality random seeds to be derived from a PUF.

For a good PUF, typically, the inter-device entropy (the entropy related to differences in PUF responses between devices) dominates the noisy entropy. Unfortunately, a traditional random number test, e.g., the FIPS 140-1 tests, on the second noisy bit string will thus succeed with high probability even if the noise entropy is too low.

Cryptographic device 102 comprises a statistical unit 160 arranged to execute a statistical test during the reconstruction phase for verifying a noise level of the physical unclonable function. The statistical test addresses the second problem indicated above, i.e., detecting that the PUF had too little noise entropy for the reliable generation of a random seed.

The statistical test has access to the debiasing data and the second noisy bit string. Although the debiasing data will not allow to directly identify bits of the first noisy bit string, the debiasing will give information about the first noisy bit string that can be compared to the second noisy bit string. In an embodiment, the debiasing data indicates which bit pairs were equal or unequal in the first noisy bit string. The statistical test can verify if the same bit pairs in the second noisy bit string are still equal or unequal. This does not necessarily preclude that they have changed: for example, a bit pair may have changed from 00 to 11 or from 01 to 10; detecting such changes is not possible with this debiasing data. Nevertheless, if only few changes are detected between the first and second noisy bit string the PUF likely has a low noise entropy.

In an embodiment, the statistical test is arranged to use the debiasing data and the second noisy bit string to count the number of bit pairs which are equal in the first noisy bit string but unequal in the second noisy bit string and/or unequal in the first noisy bit string but equal in the second noisy bit string a count. The statistical test determines that the noise level of the physical unclonable function is sufficient if the count is above a threshold.

The threshold may be determined from the statistical distribution of the PUF, for example, the PUF's noise rate according to its specification. Furthermore, the number of bits in the second noisy bit string and the desired false positive rate is known. From these parameters the threshold may be determined.

For example, the first noisy bit string may be regarded as bits $b_0 b_1 b_2 b_3 \ldots$, divided in bit pairs $b_{2i} b_{2i+1}$ for non-negative integers i. The second noisy bit string may be regarded as bits $s_0 s_1 s_2 s_3 \ldots$, divided in bit pairs $s_{2i} s_{2i+1}$. The statistical test counts the number of i for which $b_{2i} b_{2i+1}$ is an equal pair but $s_{2i} s_{2i+1}$ is an unequal pair and/or vice versa.

Cryptographic device 102 comprises a random seed generating unit 165 arranged to generate a random seed by applying an entropy concentration function to a noisy bit string produced by the physically unclonable function only if the statistical test indicates correct functioning. An entropy concentration function concentrates the entropy in a larger string, in this case second noisy bit string 114 in a smaller string, in this case, the random seed. Examples of entropy concentration functions are hash functions, in particular cryptographic hash functions such as SHA-1, compression functions, and derivation functions for deriving a seed, e.g., as defined in NIST-SP800-90, etc.

The random seed may be used in a pseudorandom number generator arranged to generate a sequence of random number in dependence upon the random seed. Random numbers may be used in a many cryptographic protocols, and have also non-cryptographic applications. The pseudorandom number generator is not separately shown in FIG. 9a.

For example, the pseudorandom number generator may be a block cipher, say AES, running in counter mode, starting from the random seed, or a stream cipher such as RC4 keyed with the random seed, Fortuna seeded with the random seed, etc.

In theory, if the PUF is working correctly, e.g., is both stable and random enough, the same second noisy bit string may be used to reconstruct a cryptographic key and to derive a random seed. The random seed is computed from the uncorrected second noisy bit string whereas the cryptographic key is reconstructed from the corrected second noisy bit string. For example, in an embodiment, random seed generating unit 165 is arranged to generate a random seed by applying an entropy concentration function to the second noisy bit string only if the statistical test indicates correct functioning. If the random seed is long enough and random enough, the noise in the uncorrected second noisy bit string will dominate any information present in the uncorrected second noisy bit. In this case, a strong non-invertible entropy concentration function is advisable, e.g., a cryptographic hash function.

However, to avoid any chance that information on the cryptographic key may leak out through the random number generation a different PUF response may be used to produce the random seed. For example, in an embodiment, the physically unclonable function 110 is arranged to produce the second noisy bit string 114 and a further noisy bit string 116 during the reconstruction phase, second noisy bit string 114 and a further noisy bit string 116 being non-overlapping. The random seed generating unit 165 is arranged to apply an entropy concentration function to the further noisy bit string only if the statistical test indicates correct functioning. This has the advantage that the random numbers cannot leak information on the cryptographic key.

For example, in an embodiment, the PUF is memory based, the first and second noisy bit string are obtained from first memory addresses, and the further noisy bit string is obtained from second memory addresses, the first and second memory addresses being different and preferably non-overlapping. The first and second noisy bit string may be regarded as a response to the same first challenge, e.g., the same addresses; the further noisy bit string may be regarded as a response to a second challenge, different from the first challenge, e.g. different addresses. Other PUFs may be used in the manner, for example a delay PUF may challenged with a first challenge to produce the first and second noisy bit strings and a challenged with a second challenge during reconstruction to produce the further noisy bit string.

FIG. 9a shows an embodiment using a further noisy bit string 116. For example, statistical test or tests are performed on second noisy bit string 114 and the debiasing data 142. If the statistical test indicates that the PUF is working within its specification, e.g., has sufficient entropy or sufficient noise, etc, a random seed is now derived from the further noisy bit string 116. In an embodiment, the second and further noisy bit strings are statistically independent as they are obtained from a different part of the PUF, whereas the first and second bit strings are the same except for noise.

Experiments have shown that statistics computed from the second noisy bit string are representative for the whole PUF and thus also for the further noisy bit string. This relationship may be further improved by interleaving the second and further noisy bit string. For example, the PUF may be a memory based PUF, a first and third memory address contributing to the further bit string, a second and fourth memory address contributing to the second bit string, the first being smaller than the second being smaller than the third being smaller than the fourth address.

Figure 9B:
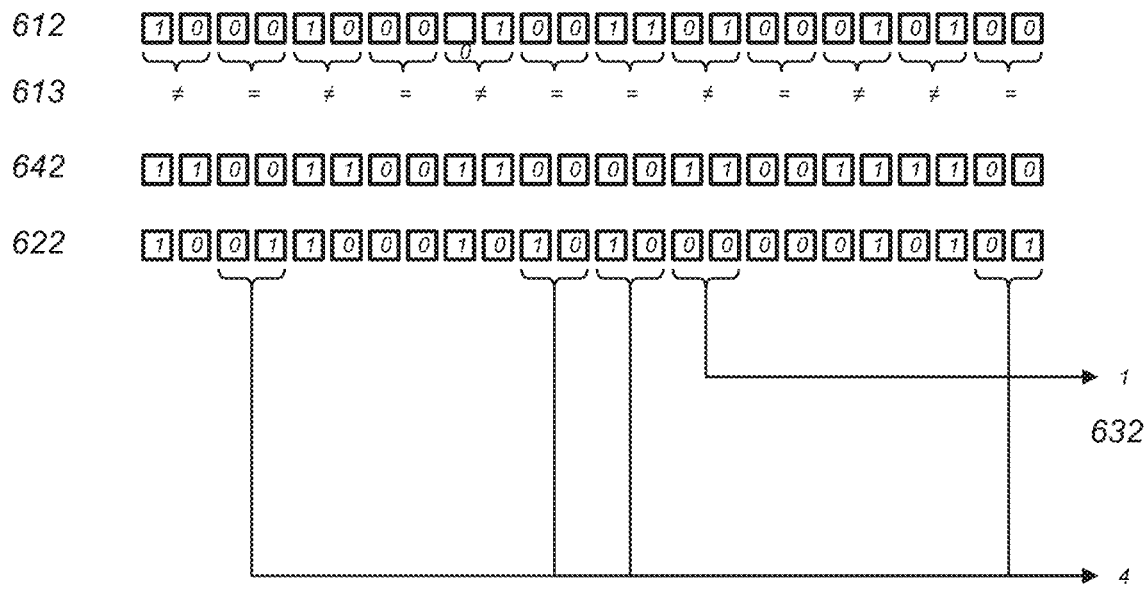

FIG. 9b illustrates different embodiments, using data of FIG. 6. FIG. 9b shows a first PUF response 612 divided into a sequence of bit pairs 613, debiasing data 642 and a second PUF response 622. From debiasing data 642 it may be determined which bit pairs were equal and which were unequal in the first noisy bit string, even though this (whole) first noisy bit string may not be available during reconstruction; in this case zero pairs in debiasing data 642 indicate an equal pair in first noisy bit string 612 and one pairs in debiasing data 642 indicate an unequal pair in first noisy bit string 612.

In an embodiment, the statistical unit is arranged to
determine, from the debiasing data, unequal bit pairs in the first bit string,
count the number of bit pairs in the second noisy bit string which are an equal bit pair in the second noisy bit string and an unequal bit pair in the first bit string, obtaining a first number. In FIG. 9b, such pairs have been indicated with a curly bracket. The first number is given at reference 632, which for this example is 1.
verify the noise level of the physical unclonable function if the first number is above a first threshold In an embodiment, the statistical unit is arranged to
determine, from the debiasing data, equal bit pairs in the first bit string,
count the number of bit pairs in the second noisy bit string which are an unequal bit pair in the second noisy bit string and an equal bit pair in the first bit string, obtaining a second number. In FIG. 9b, such pairs have been indicated with a curly bracket. The second number is given at reference 634, which for this example is 4.
verify the noise level of the physical unclonable function if the second number is above a second threshold In an embodiment, both combinations are counted which would result in the sum of the first and second number for the count; in this case 5.

Practical Example

Embodiment of the debiasing solutions as described herein identify pairs of equal bits during enrollment which should subsequently be discarded or erased during reconstruction. An embodiment of the test checks during reconstruction whether these marked pairs in a PUF block of certain size effectively contain equal bits, counts the number of pairs for which this is not the case, and verifies that this number is above a certain threshold with respect to the total number of marked pairs. This threshold can be determined upfront based on the block size, the required PUF noise-entropy quality parameters and the desired false-positive rate.

Other test statistics (instead of total number of unequal pairs which were marked equal) based on the same behavior can be used, e.g. longest run of/in between unequal pairs which were marked equal.

This test requires that the PUF response is reevaluated in between enrollment and reconstruction. If this is not the case, this test cannot produce a meaningful outcome and is not performed or ignored.

In this example: A 1 Kbyte (8192 bit) portion of a PUF response (the further noisy bit string) is used to seed a DRBG with security strength 128-bit. According to [NIST, SP800-90A, Recommendation for Random Number Generation Using Deterministic Random Bit Generators], the min-entropy of the noise of this PUF response data should be at least 192 bit. It is known that this PUF can be biased up to [30%-70%]. For such a PUF to provide sufficient noise min-entropy with 8192 bits, its (average) bit error rate is determined to have to be at least 2.9%.

Another portion (6864 bit) of this PUF response (the first and second noisy bit string) is used for key generation. This portion can be completely separate from the portion used for seeding the DRBG, but since they come from the same PUF, it is assumed that they have the same qualities with respect to bias and bit error rate. The portion used for key generation is passed through an error-correction mechanism deploying the code-offset helper data construction in combination with a Von Neumann-based debiasing pre-processing (as described herein). The debiasing pre-processing detects pairs of equal bits during enrollment which are consequentially ignored (discarded or erased) during later reconstructions.

Test Details:

Because during a key reconstruction the key generator with debiasing has knowledge of bit pairs which should be equal, it can get an estimate the average bit error rate by observing the number of bit pairs which were marked as equal but are not equal anymore during reconstruction. In the analysis we model the PUF as having independent and identically distributed bits.

For a PUF response with identically independently distributed (i.i.d.) bits with bias p and average bit error rate $p_e$, the probability of observing an equal bit pair is $(1-p)^2+p^2$, and the number of observed equal bit pairs in an n-bit PUF response is binomially distributed with parameters (floor(n/2), $(1-p)^2+p^2$). The probability of observing an unequal bit pair during reconstruction, given that this pair was marked as being equal during enrollment, can be determined to be as follows:

$Prob$(unequal pair @ reconstruct|equal pair @ enroll) =

$2^*(1-p_e/(2(1-p)))^*(p_e/(2(1-p)))^*(1-p)^2/((1-p)^2+p^2) +$ $2^*(1-p_e/(2p))^*(p_e/(2p))^*p^2/((1-p)^2+p^2) =$ $p_e^*(1-p_e)/(p^2+(1-p)^2).$

Consequentially, the probability of observing an equal pair at enrollment which is unequal at reconstruction becomes:

$Prob$(unequal pair @ reconstruct and equal pair @ enroll) =

$Prob$(unequal pair @ reconstruct|equal pair @ enroll)$^*$ $Prob$(equal pair @ enroll) =

$(p_e^*(1-p_e))/(p^2+(1-p)^2)^*((1-p)^2+p^2) = p_e^*(1-p_e).$

Interestingly, this probability is independent of the bias of the PUF response, but only depends on the average bit error rate. This entails that the number of bit pairs for which this happens only depends on the average bit error rate, and an observation of this number can be used to assess the average bit error rate level.

Based on this result, a lower threshold for the number of observed pairs which were marked equal during enrollment but are unequal at reconstruction can be set as follows, for the given example:

$T=BinoCDF^1(10^{-6};6864/2,2.9\%^*(1-2.9\%))=54.$

Figure 10:
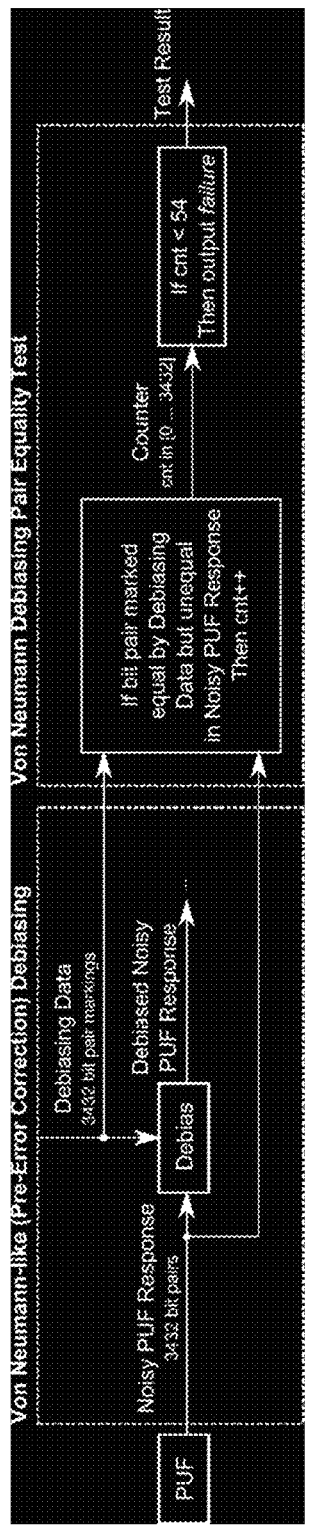

Hence if the average bit error rate is sufficiently high, then with high probability ($>1-10^{-6}$), more than 54 of these bit pairs should be observed. If this is not the case, then the Von Neumann Debiasing Pair Equality Test will output a failure. The basic flow of this test for this example key generator is shown in FIG. 10. Note that a failing test in this situation in principle has no consequences for the debiasing and/or key generation itself; the test result (based on the debiasing) is only of importance for the seeding of the DRBG.

Figure 11:
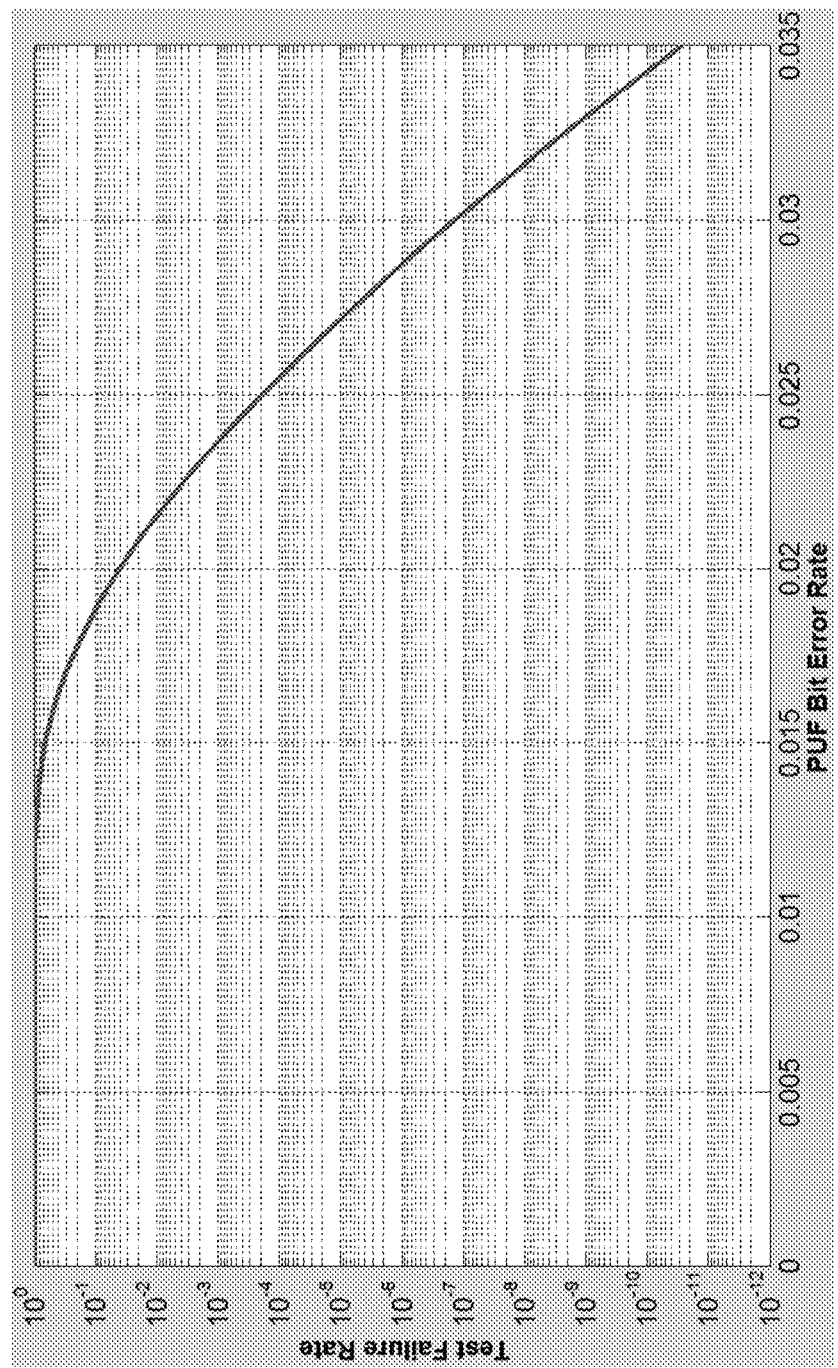
FIG. 11 is a failure rate graph for an example of a statistical test.

FIG. 11 shows a Failure Rate curve for the Von Neumann Debiasing Pair Equality Test, tuned to have a failure rate $<10^{-6}$ for an acceptable bit error rate $\geq 2.9\%$. This particular test outputs a failure if the number of observed unequal bit pairs which were marked equal at enrollment in a 6864-bit PUF response portion is smaller than 54. A failure of the test signifies that according to this test, the bit error rate (noise min-entropy) is unacceptable.

The probability of the test outputting a failure depends on the actual real bit error rate of the PUF. For the presented example, this relationship is shown in FIG. 11. This curve shows that for acceptable bit error rates larger than 2.9%, the failure rate of the test is $<10^{-6}$ (the test hence has a very small false-rejection rate $<10^{-6}$ of falsely rejecting a PUF with acceptable bit error rate). However, if the average bit error rate is smaller than the acceptable limit, the test's failure rate rises above $10^{-6}$ and approaches 100% for an average bit error rate $<1.3\%$ (there is a certain interval of unacceptable average bit error rates, approximately [1.3% ... 2.6%], which is not with 100%-certainty detected by the test).

Typically, a device to execute the debiasing data generation, noise reduction data generation, and/or key reconstruction, such as devices 100 and 101 each comprise a microprocessor (not shown) which executes appropriate software stored at the devices 100, 101; for example, that software may have been downloaded and/or stored in a corresponding memory, e.g., a volatile memory such as RAM or a non-volatile memory such as Flash (not shown). Alternatively, the devices 100 and 101 may, in whole or in part, be implemented in programmable logic, e.g., as field-programmable gate array (FPGA). Devices 100 and 101 may be implemented, in whole or in part, as a so-called application-specific integrated circuit (ASIC), i.e., an integrated circuit (IC) customized for their particular use.

In an embodiment, the electronic cryptographic device comprises a debiasing circuit and a key reconstruction circuit. The electronic cryptographic device may also comprise one or more of a noise-reduction circuit, an error corrector circuit, a reliability information extractor circuit, a soft decision decoder circuit, a statistical test circuit, a random seed generator circuit. The circuits implement the corresponding units described herein. The circuits may be a processor circuit and storage circuit, the processor circuit executing instructions represented electronically in the storage circuits. The circuits may also be FPGA, ASIC or the like.

Figure 7:
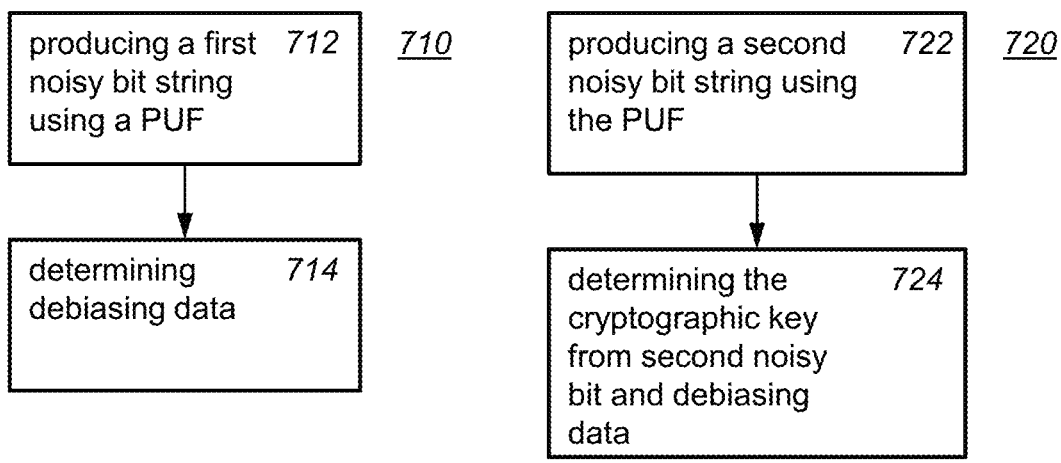

FIG. 7 schematically illustrates an embodiment of an electronic cryptographic method 700 arranged to determine a cryptographic key. Method 700 has an enrollment phase 710 and a later reconstruction phase 720.

Enrollment phase 710 comprises
producing 712 a first noisy bit string using a physically unclonable function (PUF) (110)
determining 714 debiasing data from the first noisy bit string for reducing bias in the first noisy bit string, the debiasing data marking bits in the first noisy bit string as retained or discarded, Reconstruction phase 720 comprises
producing 722 a second noisy bit string using the physically unclonable function (PUF) (110)
determining 724 the cryptographic key from bits in the second noisy bit string marked as retained by the debiasing data, the cryptographic key being independent from bits in the second noisy bit string marked as discarded by the debiasing data.

The cryptographic key may also be determined during the enrollment phase, if such is convenient, e.g., from bits in the first noisy bit string marked as retained.

Many different ways of executing method 700 are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 700. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 8A:
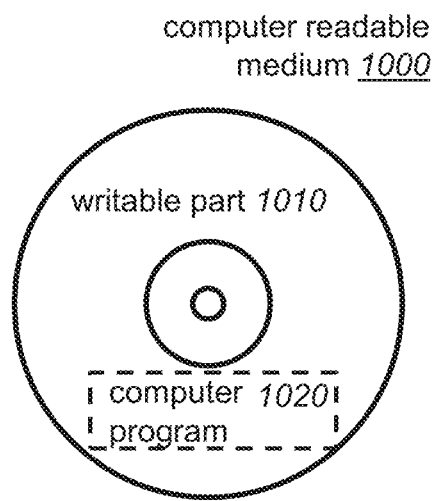
FIG. 8*a* shows a computer readable medium having a writable part comprising a computer program according to an embodiment.

FIG. 8a shows a computer readable medium 1000 having a writable part 1010 comprising a computer program 1020, the computer program 1020 comprising instructions for causing a processor system to perform a method to determine a cryptographic key, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of method to determine a cryptographic key.

Figure 8B:
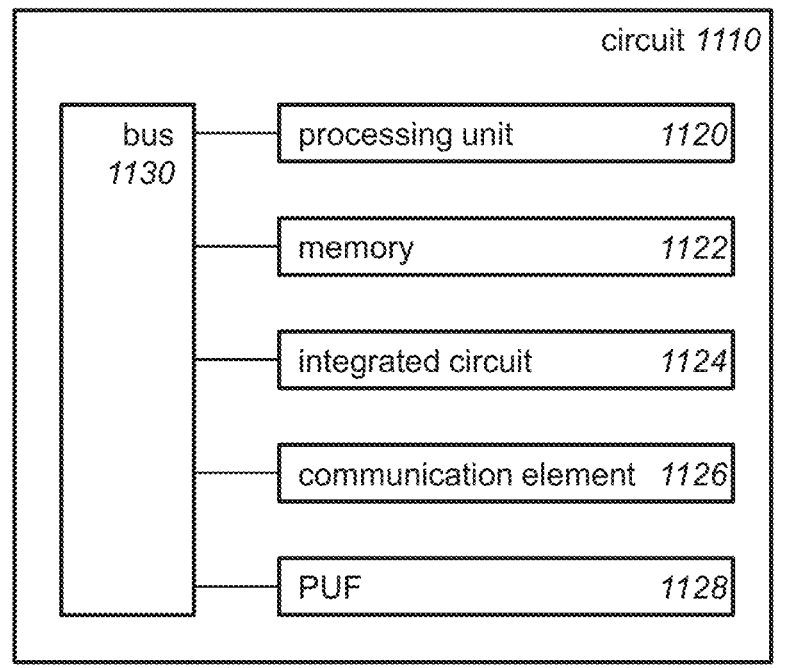
FIG. 8*b* shows a schematic representation of a processor system according to an embodiment, FIG. 9*a* schematically shows an example of an embodiment of an electronic cryptographic device, FIG. 9*b* schematically illustrates a statistical test in an example of an embodiment of an electronic cryptographic device, FIG. 10 schematically illustrates in a flowchart an embodiment of a statistical test.

FIG. 8b shows in a schematic representation of a processor system 1100 according to an embodiment. The processor system comprises one or more integrated circuits 1110. The architecture of the one or more integrated circuits 1110 is schematically shown in FIG. 8b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor system 1100 may comprise a PUF 1128 for use in an embodiment. Processor 1120, memory 1122, dedicated IC 1124, PUF 1128 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. An electronic cryptographic device configured to determine a cryptographic key, the electronic cryptographic device configured for an enrollment phase and a later reconstruction phase, the electronic cryptographic device comprising:
a physically unclonable function configured to produce a first noisy bit string during the enrollment phase and a second noisy bit string during the reconstruction phase;
a debiasing unit configured to reduce bias in the first noisy bit string, the debiasing unit being configured to determine debiasing data from the first noisy bit string during the enrollment phase, the debiasing data marking bits in the first noisy bit string as retained or discarded;
a noise-reduction unit configured to obtain one or more first code words from a first error correcting code and to determine noise-reduction data for bits in the first noisy bit string marked by the debiasing data as retained from the one or more code words during the enrollment phase;
a normalizer configured to apply noise-reduction data to bits in the second noisy bit string marked as retained by the debiasing data during the reconstruction phase, determining the one or more first code words and noise;
an error corrector configured to correct the one or more noisy first code words; and
a key reconstruction unit configured to determine the cryptographic key from the one or more corrected code words, the cryptographic key being independent from bits in the second noisy bit string marked as discarded by the debiasing data.

2. The electronic cryptographic device as in claim 1, wherein the first and second noisy bit string are partitioned in a first and second sequence of bit pairs respectively, and
the debiasing unit is configured to identify unequal bit pairs in the first sequence of bit pairs, an unequal bit pair including two unequal bits, an equal bit pair including two equal bits, the debiasing data marking unequal bit pairs in the first noisy bit string as retained.

3. The electronic cryptographic device as in claim 2, wherein
the debiasing unit in configured to identify a first and second equal bit pair in the sequence of bit pairs, the first equal bit pair being the inverse of the second equal bit pair, the debiasing data marking at least the first equal bit pair as retained.

4. The electronic cryptographic device as in claim 2, wherein
the debiasing unit is configured to identify a first and second set of equal bit pairs in the first sequence of bit pairs into which the first noisy bit string is partitioned, the first and second set having the same size, each first bit pair in the first set of equal bit pairs being the same as each second bit pair in the first set of equal bit pairs, each further first bit pair in the second set of equal bit pairs being the same as each further second bit pair in the second set of equal bit pairs, each first bit pair of the first set of equal bit pairs being the inverse of each further first bits pair in the second set of equal bit pairs, the debiasing data marking at least the equal bit pairs of the first set of equal bit pairs as retained.

5. The electronic cryptographic device as in claim 1, wherein the bits in the first noisy bit string marked by the debiasing information as retained have lower bias than the first noisy bit string.

6. The electronic cryptographic device as in claim 1, wherein
the noise-reduction data comprising a difference between the bits in the first bit string marked by the debiasing information as retained and the one or more code words, and wherein the noise-reduction data does not comprise a difference between the bits in the first bit string marked by the debiasing information as discarded and bits in the one or more code words.

7. The electronic cryptographic device as in claim 1, wherein
bits in the one or more code words correspond to bits in the first noisy bit string, the noise-reduction data comprising a difference between the bits in the first bit string marked by the debiasing information as retained and bits in the one or more code words corresponding to retained bits in the first noisy bit string.

8. The electronic cryptographic device as in claim 7, wherein
bits in the one or more code words corresponding to retained bits in the first noisy bit string have the same index in the one or more code words and the first noisy bit string respectively.

9. The electronic cryptographic device as in claim 7, wherein the debiasing unit is configured to mark all unequal bit pairs in the first noisy bit string as retained and to mark all equal bit pairs as discarded in the debiasing data.

10. The electronic cryptographic device as in claim 1, wherein the first and second noisy bit string are partitioned in a first and second sequence of bit pairs respectively,
the debiasing unit is configured to identify unequal bit pairs in the first sequence of bit pairs, an unequal bit pair including two unequal bits, an equal bit pair including two equal bits, the debiasing data marking unequal bit pairs in the first noisy bit string as retained,
the debiasing unit is configured to identify a first and second equal bit pair in the sequence of bit pairs, the first equal bit pair being the inverse of the second equal bit pair, the debiasing data marking at least the first equal bit pair as retained, and
the second equal bit pair in the sequence of bit pairs is marked as retained by the debiasing data if the first and second bit pair are used in a difference with the same code word of the one or more code words and as discarded otherwise.

11. The electronic cryptographic device as in claim 1, wherein the first and second noisy bit string are partitioned in a first and second sequence of bit pairs respectively,
the debiasing unit is configured to identify unequal bit pairs in the first sequence of bit pairs, an unequal bit pair including two unequal bits, an equal bit pair including two equal bits, the debiasing data marking unequal bit pairs in the first noisy bit string as retained,
the debiasing unit is configured to identify a first and second equal bit pair in the sequence of bit pairs, the first equal bit pair being the inverse of the second equal bit pair, the debiasing data marking at least the first equal bit pair as retained, and
the debiasing unit is configured to determine a first permutation of the first sequence of bit pairs so that the first and second equal bit pair are used in a difference with the same code word of the one or more code words, the key reconstruction unit being arranged to apply the first permutation to the second sequence of bit pairs.

12. The electronic cryptographic device as in claim 1, wherein the noise-reduction unit is configured to select the one or more first code words from the first error correcting code by encoding one or more second code words from a second error correcting code.

13. The electronic cryptographic device as in claim 12, further comprising:
a reliability information extractor configured to determine reliability information indicative of a reliability of the correcting of the one or more noisy first code words; and
a soft decision decoder configured to decode the one or more second code words using the reliability information.

14. The electronic cryptographic device as in claim 1, wherein
the debiasing unit is configured to permute the first noisy bit string by a second permutation to group bits in a first and second portion of the first noisy bit string together before marking bits in the first noisy bit string as retained or discarded, the first and second portion of the first noisy bit string having a first and second bias level respectively, and
the key reconstruction unit is configured to permute the second noisy bit string by the second permutation to group bits in the first and second portion of the second noisy bit string together before determining bits in the second noisy bit string marked as retained by the debiasing data.

15. The electronic cryptographic device as in claim 1, wherein the first error correcting code is a repetition code.

16. The electronic cryptographic device as in claim 2, further comprising:
a statistical unit configured to execute a statistical test during the reconstruction phase for verifying a noise level of the physical unclonable function,
the statistical test being arranged to use the debiasing data and the second noisy bit string to count the number of bit pairs which are equal in the first noisy bit string but unequal in the second noisy bit string and/or unequal in the first noisy bit string but equal in the second noisy bit string, and to verify the noise level of the physical unclonable function as sufficient if the count is above a threshold.

17. The electronic cryptographic device as in claim 16, further comprising:
a random seed generating unit configured to generate a random seed by applying an entropy concentration function to a noisy bit string produced by the physically unclonable function only if the statistical test indicates correct functioning, wherein
the random seed generating unit is configured to apply the entropy concentration function to the second noisy bit string,
or, wherein
the physically unclonable function is configured to produce a further noisy bit string during the reconstruction phase, the second noisy bit string being different from the further noisy bit string, and
the random seed generating unit is configured to apply the entropy concentration function to the further noisy bit string.

18. An electronic cryptographic method for determining a cryptographic key, the electronic cryptographic method comprising:
an enrollment phase including
producing a first noisy bit string using a physically unclonable function,
determining debiasing data from the first noisy bit string for reducing bias in the first noisy bit string, the debiasing data marking bits in the first noisy bit string as retained or discarded,
obtaining one or more first code words from a first error correcting code, and
determining noise-reduction data for bits in the first noisy bit string marked by the debiasing data as retained from the one or more code words; and
the reconstruction phase including
producing a second noisy bit string using the physically unclonable function,
applying noise-reduction data to bits in the second noisy bit string marked as retained by the debiasing data, determining the one or more first code words and noise,
correcting the one or more noisy first code words, and
determining the cryptographic key from the one or more corrected code words, the cryptographic key being independent from bits in the second noisy bit string marked as discarded by the debiasing data.

19. A non-transitory tangible computer readable storage medium including data loadable in a programmable apparatus, the data representing instructions executable by the programmable apparatus, the instructions comprising:
one or more obtaining instructions configured to obtain a first noisy bit string from a physically unclonable function;
one or more determining instructions configured to determine debiasing data from the first noisy bit string for reducing bias in the first noisy bit string, the debiasing data marking bits in the first noisy bit string as retained or discarded;
one or more determining instructions configured to obtain one or more first code words from a first error correcting code and to determine noise-reduction data for bits in the first noisy bit string marked by the debiasing data as retained from the one or more code words;
one or more obtaining instructions configured to obtain a second noisy bit string from the physically unclonable function;
one or more applying instructions configured to apply noise-reduction data to bits in the second noisy bit string marked as retained by the debiasing data during the reconstruction phase, determining the one or more first code words and noise;
one or more correcting instructions configured to correct the one or more noisy first code words; and
one or more determining instruction to determine the cryptographic key from the one or more corrected code words, the cryptographic key being independent from bits in the second noisy bit string marked as discarded by the debiasing data.

* * * * *